US012759285B2

(12) United States Patent
Ujiie

(10) Patent No.: US 12,759,285 B2
(45) Date of Patent: Oct. 13, 2026

(54) PRINTING APPARATUS, METHOD FOR CONTROLLING PRINTING APPARATUS, AND STORAGE MEDIUM

(71) Applicant: CANON KABUSHIKI KAISHA, Tokyo (JP)

(72) Inventor: Keisuke Ujiie, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 18/544,581

(22) Filed: Dec. 19, 2023

(65) Prior Publication Data

US 2024/0198659 A1 Jun. 20, 2024

(30) Foreign Application Priority Data

Dec. 20, 2022 (JP) ................................ 2022-203528

(51) Int. Cl.
*B41J 29/393* (2006.01)
*B41J 2/045* (2006.01)

(52) U.S. Cl.
CPC ........... *B41J 2/0451* (2013.01); *B41J 29/393* (2013.01)

(58) Field of Classification Search
CPC .............. B41J 29/393; B41J 2029/3935; B41J 2/0451; B41J 2/2142
See application file for complete search history.

(56) References Cited

U.S. PATENT DOCUMENTS

| | | | |
|---|---|---|---|
| 6,520,623 B2 | 2/2003 | Miyake et al. | |
| 11,298,937 B2 | 4/2022 | Oikawa et al. | |
| 2023/0391073 A1 | 12/2023 | Ujiie | |

FOREIGN PATENT DOCUMENTS

| | | | |
|---|---|---|---|
| EP | 3318405 A1 * | 5/2018 | ................ B41J 2/01 |
| JP | 9-174824 A | 7/1997 | |
| JP | 2007-152853 A | 6/2007 | |
| JP | 2013-046990 A | 8/2013 | |
| JP | 2021-030706 A | 3/2021 | |
| WO | 2017/002658 A1 | 1/2017 | |

OTHER PUBLICATIONS

Office Action dated Aug. 21, 2026 in Japanese Patent Application No. 2022-203528.

* cited by examiner

*Primary Examiner* — Julian D Huffman
(74) *Attorney, Agent, or Firm* — Venable LLP

(57) ABSTRACT

A printing apparatus includes a selection unit configured to select a predetermined number of nozzles from nozzles of a printhead including a plurality of nozzles configured to discharge a liquid droplet; and a detection unit configured to detect a discharge state of a liquid droplet by using the predetermined number of nozzles being selected. The selection unit selects the predetermined number of nozzles such that a nozzle having a discharge abnormality is not included in the predetermined number of nozzles.

13 Claims, 17 Drawing Sheets

PRINTING APPARATUS, METHOD FOR CONTROLLING PRINTING APPARATUS, AND STORAGE MEDIUM

BACKGROUND OF THE INVENTION

Field of the Invention

The present invention relates to a technology for detecting a discharge state of ink droplets discharged from a printhead of a printing apparatus.

Description of the Related Art

In the market of inkjet printing apparatuses that can print large-sized printed matters, applications of output matters are diverse, including CAD line drawings, posters, and art works. For this reason, the printing media suitable for the applications also vary from cost-sensitive to performance-sensitive. Furthermore, the amount of discharged ink and the discharge speed may change depending on various factors such as individual differences in the printing apparatus and the printhead, physical properties for each ink color, use situations, environmental influences, and the like.

In particular, when the ink discharge speed changes, the configuration that enables reciprocal printing of the printhead has a difference occurring between the adhesion position of the ink droplets discharged in the forward direction of the printhead and the adhesion position of the ink droplets discharged in the backward direction of the printhead. As a result, the definition of formed images and the reproducibility of thin lines deteriorate, and the overall image quality deteriorates.

Japanese Patent Laid-Open No. 2007-152853 discloses a registration adjusting method, by including a measurement unit that measures a discharge speed of ink, to appropriately set discharge timing from a moving speed and a discharge speed of reciprocal printing based on a measurement result.

If the discharge speed of ink can be accurately measured, a registration adjusting method can be provided.

However, in the inkjet type printing apparatus, in addition to the change in discharge speed, there is a case where the flying state of the ink droplets discharged from the head becomes unstable, and the landing on a paper surface is not accurately performed. The known type has a problem of failing to detect image degradation due to an unstable flying state.

SUMMARY OF THE INVENTION

The present invention has been made in view of the above-described problems, and provides a printing apparatus that can more accurately land ink on a printing medium.

According to a first aspect of the present invention, there is provided a printing apparatus comprising: a selection unit configured to select a predetermined number of nozzles from nozzles of a printhead including a plurality of nozzles configured to discharge a liquid droplet; and a detection unit configured to detect a discharge state of a liquid droplet by using the predetermined number of nozzles being selected, wherein the selection unit selects the predetermined number of nozzles such that a nozzle having a discharge abnormality is not included in the predetermined number of nozzles.

According to a second aspect of the present invention, there is provided a method of controlling a printing apparatus, the method comprising: selecting a predetermined number of nozzles from nozzles of a printhead including a plurality of nozzles configured to discharge a liquid droplet; and detecting a discharge state of a liquid droplet by using the predetermined number of nozzles being selected, wherein the selecting selects the predetermined number of nozzles such that a nozzle having a discharge abnormality is not included in the predetermined number of nozzles.

Further features of the present invention will become apparent from the following description of exemplary embodiments with reference to the attached drawings.

DESCRIPTION OF THE EMBODIMENTS

Figure 1:
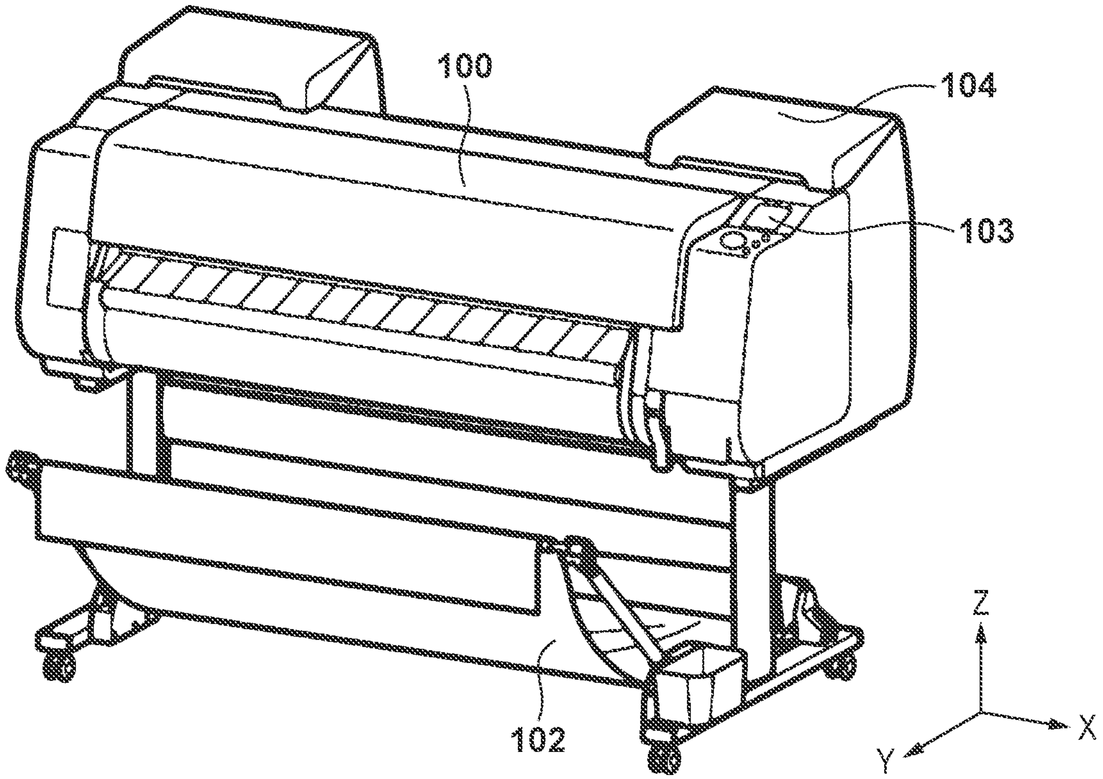
FIG. 1 is a perspective view of an inkjet printing apparatus that is a first embodiment of a printing apparatus of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Overall Description of Printing Apparatus

FIG. 1 is a perspective view of an inkjet printing apparatus (hereinafter, printing apparatus) 100 that is a first embodiment of the printing apparatus of the present invention, which uses a large printing paper (printing medium) of a size of from 10 to 60 inches or the like.

The printing apparatus 100 illustrated in FIG. 1 includes a paper discharging guide 102 configured to stack printing paper having been output, a display panel 103 configured to display various types of printing information, setting results, and the like, an operation panel unit (not illustrated) configured to set a printing mode, a printing sheet, and the like. Furthermore, the printing apparatus 100 includes an ink tank unit 104 configured to accommodate ink tanks of black, cyan, magenta, yellow, and the like and supply ink to the printhead.

Figure 2:
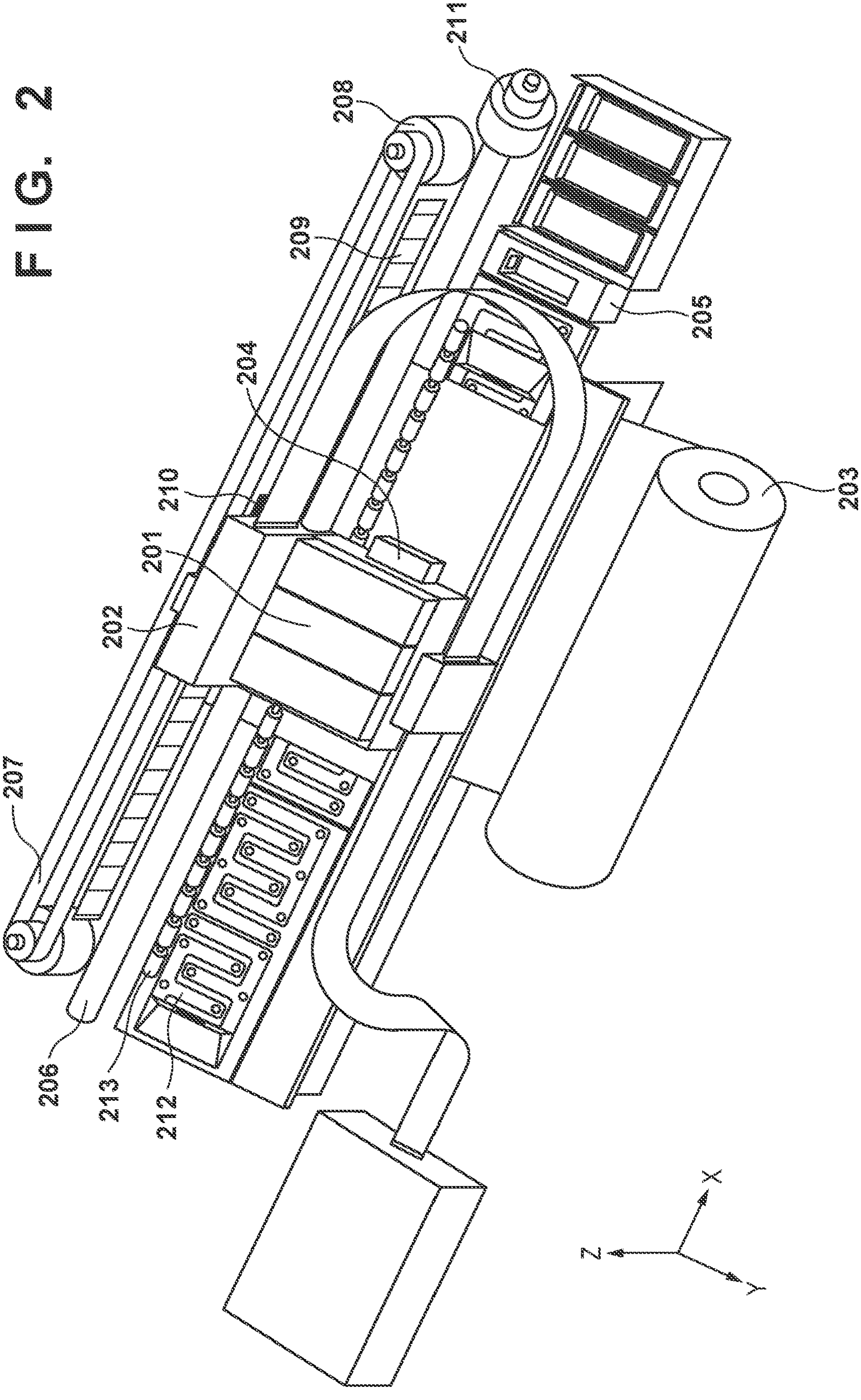
FIG. 2 is a perspective view illustrating an internal configuration of the printing apparatus.

FIG. 2 is a perspective view illustrating the internal configuration of the printing apparatus 100. In FIG. 2, a printhead 201 includes a discharging surface in which a plurality of nozzles that discharge ink droplets are arrayed, and is mounted on a carriage 202. The printhead 201 includes a distance detection sensor 204 configured to detect a distance between printing paper 203 and the printhead 201. Furthermore, the printing apparatus 100 includes a discharge speed detection sensor 205 that is arranged facing the discharging surface of the printhead 201, and configured to detect the discharge speed of an ink droplet (liquid droplet) discharged from the printhead 201. A main rail 206 supports the carriage 202 and causes the carriage 202 to perform reciprocal scan in the horizontal direction (direction orthogonal to the conveyance direction of the printing paper 203).

The carriage 202 is driven by a carriage motor 208 via a carriage conveyance belt 207. The carriage 202 is caused to perform reciprocal scan in a direction orthogonal to the conveyance direction of the printing paper 203 while acquiring position information by detecting a linear scale 209 provided in a scan direction by an encoder sensor 210 mounted on the carriage 202. Furthermore, by including a lift motor 211 configured to change the height of the carriage 202 in stages, it is possible to make the distance between the printhead 201 and the printing paper 203 close to or away from each other. The printing paper 203 is supported by a platen 212 and is conveyed in the conveyance direction by a paper conveyance roller 213. Here, the printing paper 203 will be described with an example of roll paper, but is not limited to this, and for example, cut paper may be used. The width of the printing paper 203 may be configured to correspond to a plurality of paper widths.

Figure 3:
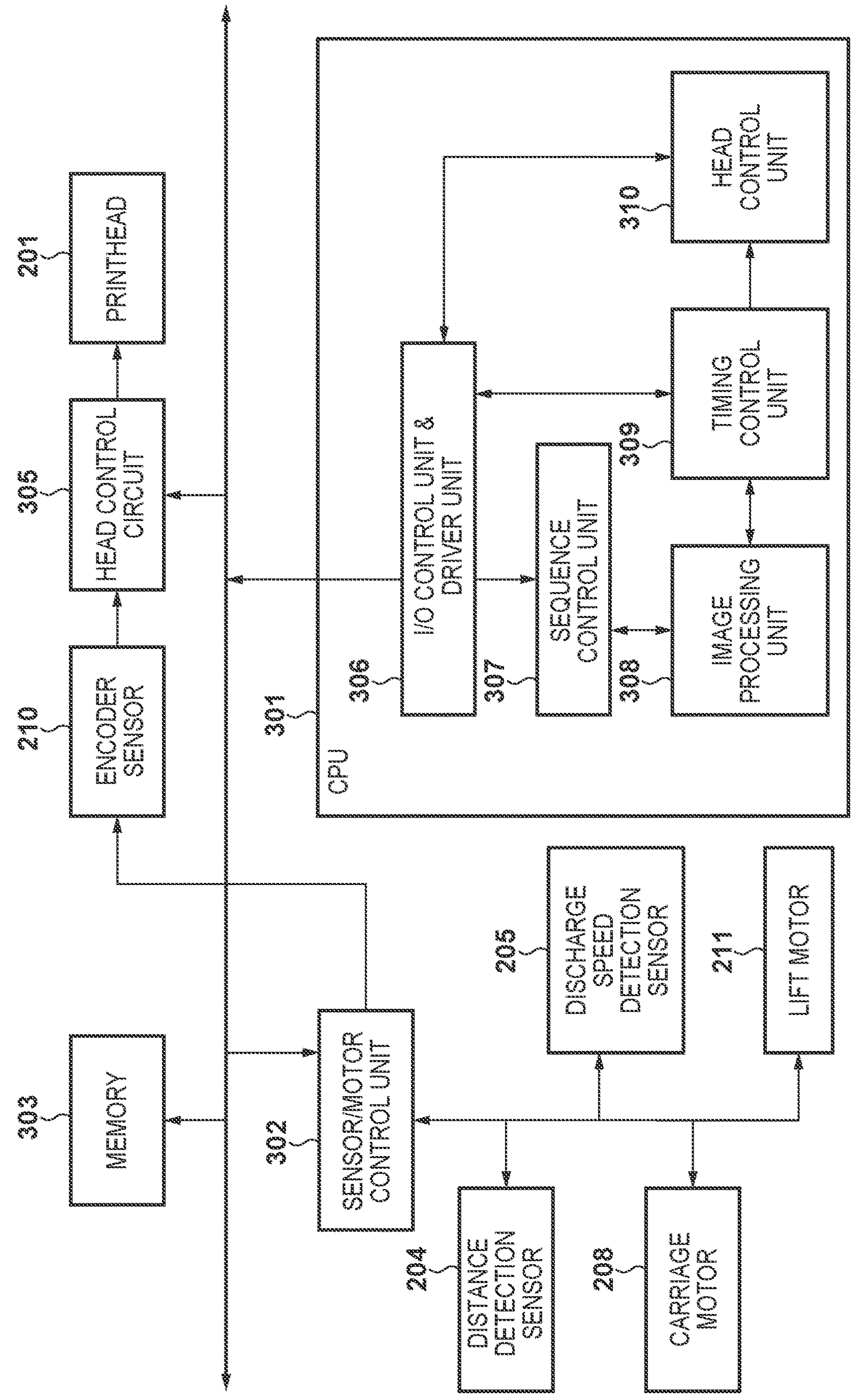
FIG. 3 is a block diagram illustrating a control configuration of the printing apparatus.

FIG. 3 is a block diagram illustrating an internal configuration of the printing apparatus 100. The printing apparatus 100 includes a CPU 301 that controls the entire apparatus, a sensor/motor control unit 302, and a memory 303 that stores various types of information such as a discharge speed and a thickness of printing paper. The CPU 301, the sensor/motor control unit 302, and the memory 303 are communicably connected. The sensor/motor control unit 302 acquires results detected by the distance detection sensor 204 and the discharge speed detection sensor 205. The sensor/motor control unit 302 controls the carriage motor 208 that scans the carriage 202 and the lift motor 211 that changes the height of the carriage 202 in stages. Furthermore, the sensor/motor control unit 302 controls a head control circuit 305 based on the position information detected by the encoder sensor 210. In the above configuration, printing data from a host apparatus (not illustrated) such as a computer is converted into a head control signal, and printing is performed on the printing paper 203 by the printhead 201.

The CPU 301 includes a driver unit 306, a sequence control unit 307, an image processing unit 308, a timing control unit 309, and a head control unit 310. The sequence control unit 307 performs overall printing control, more specifically, start and stop of each functional block, conveyance control of printing paper, scan control of the carriage 202, and the like. Each functional block is implemented, for example, by the CPU 301 reading and executing various programs from the memory 303 or the like.

The driver unit 306 outputs each control signal based on a command from the sequence control unit 307, and transmits an input signal from each unit to the sequence control unit 307. The image processing unit 308 performs image processing of performing color separation/conversion on input image data from the host apparatus. The timing control unit 309 transfers the printing data converted and generated by the image processing unit 308 to the head control unit 310 in conjunction with the position of the carriage 202. The timing control unit 309 also controls discharge timing of the printing data based on the distance between the printhead 201 and the printing paper 203 detected by the distance detection sensor 204. Furthermore, the timing control unit 309 also controls output timing of the printing data based on discharge speed information of each ink droplet discharged from the printhead 201 detected by the discharge speed detection sensor 205. The head control unit 310 converts the printing data input from the timing control unit 309 into a head control signal and outputs the head control signal, and also controls the temperature of the printhead 201 based on a command from the sequence control unit 307.

Figure 4B:
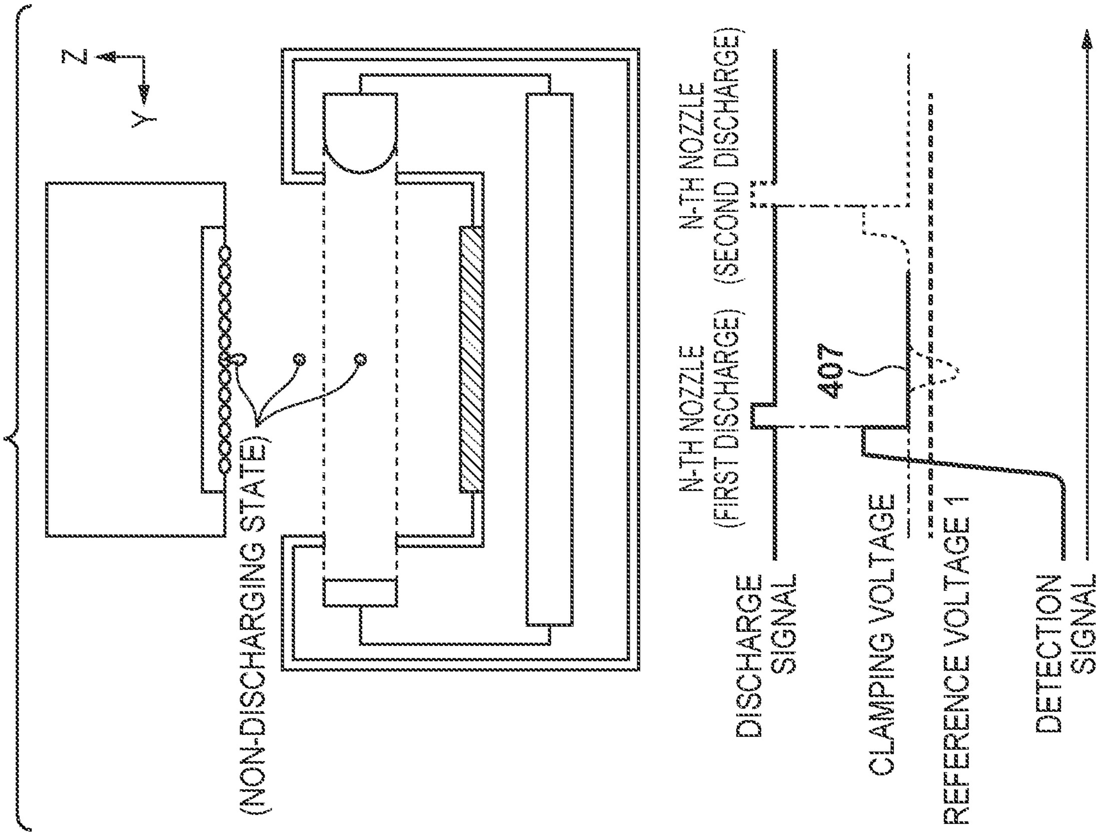
FIGS. 4A and 4B are views for explaining a detection method of a discharge state.
Figure 4A:
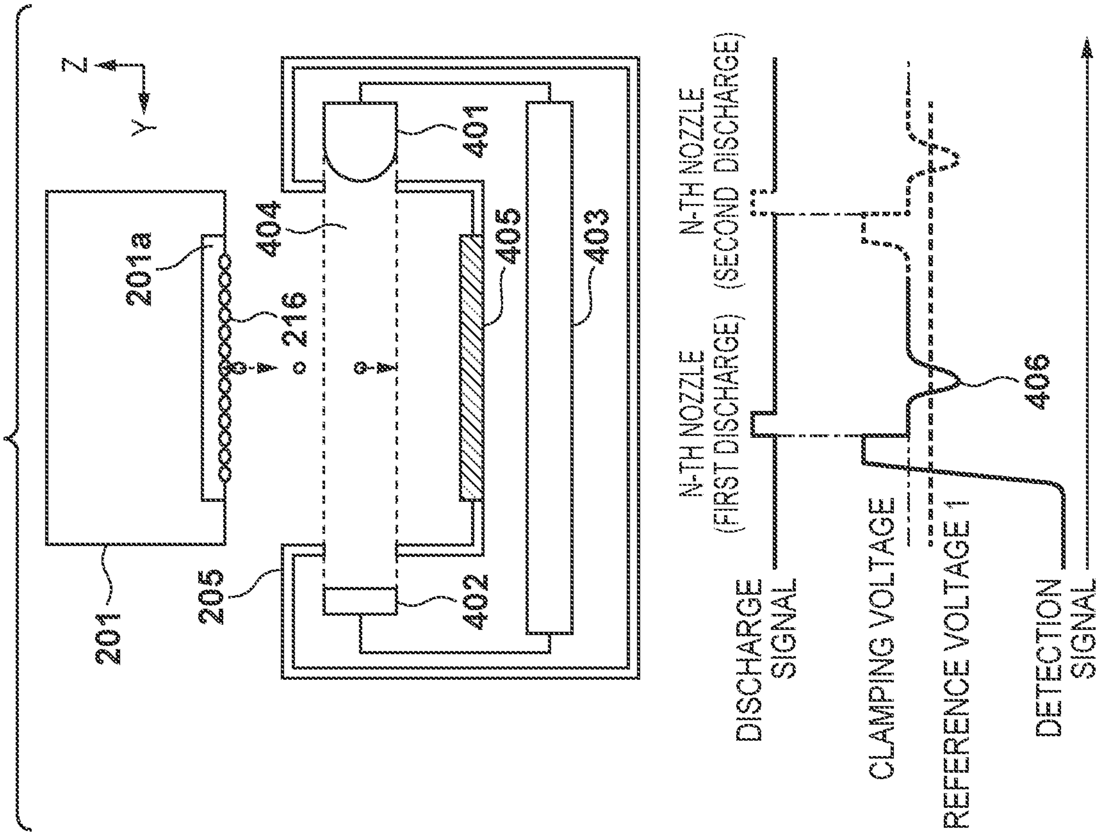

Next, a detection method (inspection method) of a discharge state of an ink droplet discharged from the printhead 201 according to the present embodiment will be described with reference to FIGS. 4A and 4B. FIGS. 4A and 4B are schematic views of the printhead 201 and the discharge speed detection sensor 205 in a state where the printing apparatus 100 is cut along a Y-Z cross section. As illustrated in FIGS. 4A and 4B, for image formation, a discharge orifice (hereinafter, also referred to as nozzle) 216 configured to discharge an ink droplet for each ink color is provided on a discharge orifice surface 201 a of the printhead 201.

Timing charts of a discharge signal for applying a drive pulse to the printhead 201 and a signal detected when the discharge speed detection sensor 205 detects passage of an ink droplet discharged from the discharge orifice 216 are also illustrated in FIGS. 4A and 4B.

The discharge speed detection sensor 205 includes a light-emitting element 401, a light-receiving element 402, and a control circuit board 403. The light-emitting element 401 emits a light flux 404, and the light-receiving element 402 receives the light flux 404 emitted by the light-emitting element 401. The control circuit board 403 detects the amount of the light received by the light-receiving element 402. The control circuit board 403 is provided thereon with a current/voltage conversion circuit that converts a current, which flows depending on the amount of light received by the light-receiving element 402, into a voltage signal, and outputs the voltage signal, and an amplification circuit for the level of the detection signal of ink droplets. Furthermore, in order to remove the influence of saturation of the output and a decrease in S/N due to variation of the detection signal level of discharge of an ink droplet caused by the influence of disturbance, the control circuit board 403 includes a clamp circuit configured to hold the level of the signal output from the amplification circuit to a predetermined value (clamp voltage) until immediately before discharge is observed.

These circuits ensure the level of the detection signal for detecting minute changes such as an ink droplet discharge. In this configuration, since the amount of light received by the light-receiving element 402 changes when an ink droplet passes through the light flux 404 of the discharge speed detection sensor 205, the discharge state of the nozzle that is a detection target can be determined by comparing the level of the detection signal being output (output signal) with a predetermined reference voltage.

The discharge speed detection sensor 205 is installed such that the optical axis of the light flux 404 is at the same position in the Z direction as the surface of the platen 212 on the side supporting the printing medium 203. A slit is provided in the vicinity of each of the light-emitting element 401 and the light-receiving element 402 to narrow the incident light flux 404 and improve the S/N ratio. The position of the printhead 201 in the X direction where the ink droplet can be discharged so that the ink droplet passes through the light flux 404 is set as a detectable position.

When the ink droplet is detected in order to detect the discharge state of the ink droplet, the sensor/motor control unit 302 controls the carriage motor 208 by a command of the sequence control unit 307 to move the printhead 201 to the detectable position. The cross-sectional area of the light flux 404 according to the present embodiment is about 2 mm×2 mm. The parallel light projection area of the ink droplet when the ink droplet passes through the light flux 404 is about 2-3 ($mm^2$).

A discharge orifice array and the light flux 404 are arranged in parallel to each other, and the creepage distance in the height direction (Z direction) is set to from 2 to 10 mm. When the creepage distance between each discharge orifice and the light flux 404 is made close, the passage of the ink droplet can be detected at a position where the light flux 404 is close to the flying distance of the discharged ink droplet, and thus the discharge state can also be stably detected. However, when the discharge orifice array and the light flux 404 are close to each other, a diffuse light component emitted from the light-emitting element 401 is reflected by the discharge orifice surface 201 *a* of the printhead 201, and a light amount component received by the light-receiving element 402 is generated. As a result, this light amount component is superimposed on the detection signal as noise with respect to the detection of the discharge state, and there is a possibility that good detection can no longer be performed. Therefore, regarding the creepage distance between the light flux 404 of the discharge speed detection sensor 205 and the discharge orifice array of the printhead 201, it is desirable to detect the discharge state with more suitable arrangement in consideration of the correlation of them. It is necessary to match the condition for detecting the discharge state of the ink droplet by the discharge speed detection sensor 205 with the discharge state of the ink droplet onto the printing medium 203 at the time of image formation Therefore, it is desirable that the light flux 404 of the discharge speed detection sensor 205 and the platen 212 supporting the printing medium 203 are arranged at substantially the same height (Z direction).

Next, the configuration for detecting the discharge state and non-discharge state of an ink droplet being discharged will be described. FIG. 4A illustrates a case where the discharge orifice 216 (N-th nozzle), which is a detection target of the discharge state of the printhead 201 by the discharge speed detection sensor 205, is normally discharging. An ink droplet is discharged toward the discharge speed detection sensor 205 based on a discharge signal output from the head control unit 310 in the CPU 301 and the head control circuit 305. The clamp circuit mentioned earlier is operated by a control signal synchronized with discharge of the ink droplet, and the signal level to be output is held at a predetermined clamp voltage value immediately before the discharge of the ink droplet is observed.

The operation by the clamp circuit is released after the discharge of the ink droplet is started, and immediately before the ink droplet discharged toward the light flux 404 shields the light flux 404. Thereafter, the detection signal level of the discharge speed detection sensor 205 decreases due to a decrease in the amount of light that occurs when the discharged ink droplet passes through the light flux 404 of the discharge speed detection sensor 205. The normal discharge state is determined by comparing the decrease in the signal level with a reference voltage value defined by the amount of change when the ink droplet shields the light flux 404. As a result, the N-th nozzle that is the detection target is determined to have normally discharged. Here, in order to further increase the reliability of the detection result of the discharge state by the discharge speed detection sensor 205, a result of performing a plurality of times of discharge from the N-th nozzle that is the detection target is illustrated.

FIG. 4B illustrates a detection result in a case where the N-th nozzle described in FIG. 4A is not normally discharging, that is, in a non-discharge state. Similarly to FIG. 4A, an ink droplet is discharged toward the discharge speed detection sensor 205 based on a discharge signal output from the head control unit 310 in the CPU 301 and the head control circuit 305. However, here in this state, the ink droplet cannot be correctly discharged, and the ink droplet does not fly with respect to the light flux 404. As a result, the ink droplet cannot shield the light flux 404, and a decrease in the amount of light that occurs when the discharge is correctly performed cannot be obtained. Therefore, the N-th nozzle that is the detection target has not normally discharged here, and is determined to be in a non-discharge state.

Figure 5B:
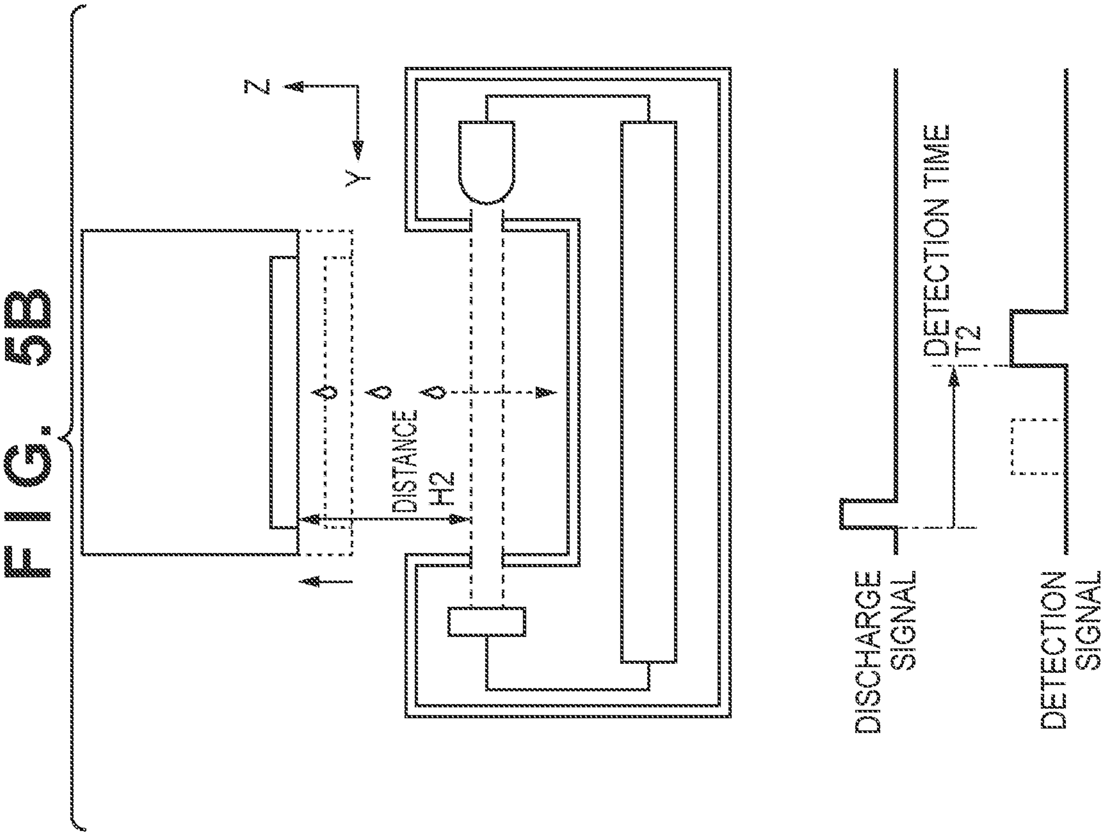
FIGS. 5A to 5D are views for explaining an operation of detecting a discharge speed of an ink droplet.
Figure 5A:
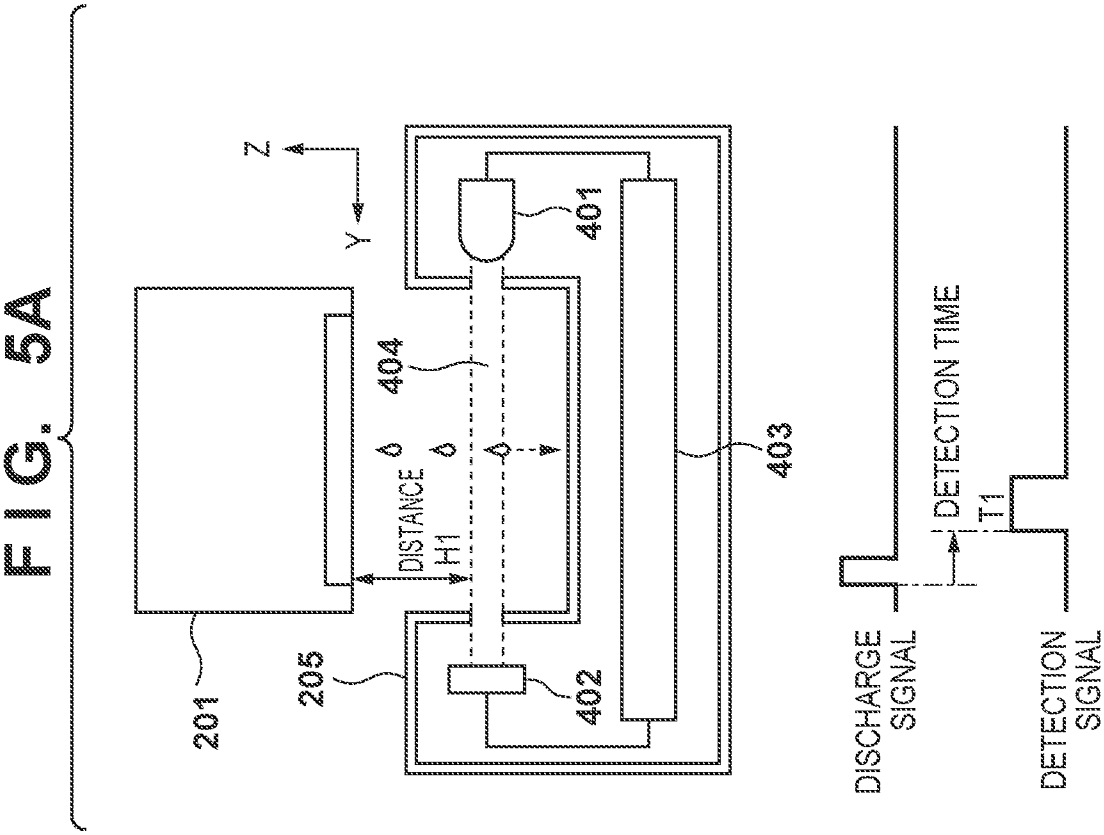

Next, FIG. 5A is a view for explaining the operation of detecting the discharge speed of an ink droplet by the discharge speed detection sensor 205. The lift motor 211 is driven to set the distance between the printhead 201 and the discharge speed detection sensor 205 to a first distance H1 and perform detection.

In FIG. 5A, an ink droplet is discharged toward the discharge speed detection sensor 205 based on a discharge signal output from the head control unit 310 in the CPU 301 and the head control circuit 305. The timing at which the ink droplet passes through the light flux 404 and the light reception amount of the light-receiving element 402 changes is output as a detection signal. Due to this, detection time T1 from when the discharge signal is given off to the printhead 201 to when the detection signal is output is detected. This detection time T1 corresponds to the time during which the ink droplet flies by the distance H1 from the printhead 201 to the discharge speed detection sensor 205.

FIG. 5B is a view illustrating a state in which the lift motor 211 is driven, and the distance between the printhead 201 and the discharge speed detection sensor 205 is further separated, as compared to FIG. 5A, to be a second distance H2.

Similarly to the case of FIG. 5A, the timing at which the ink droplet passes through the light flux 404 and the light reception amount of the light-receiving element 402 changes is output as a detection signal. Due to this, detection time T2 from when the discharge signal is given off to the printhead 201 to when the detection signal is output is detected. This detection time T2 corresponds to the time during which the ink droplet flies by the distance H2 from the printhead 201 to the discharge speed detection sensor 205.

From FIGS. 5A and 5B, discharge speed V1 of the ink droplet is calculated as follows based on the distance difference between the first distance H1 and the second distance H2 and the difference between the detection times T1 and T2.

$$V1=(H2-H1)/(T2-T1)$$

Figure 5C:
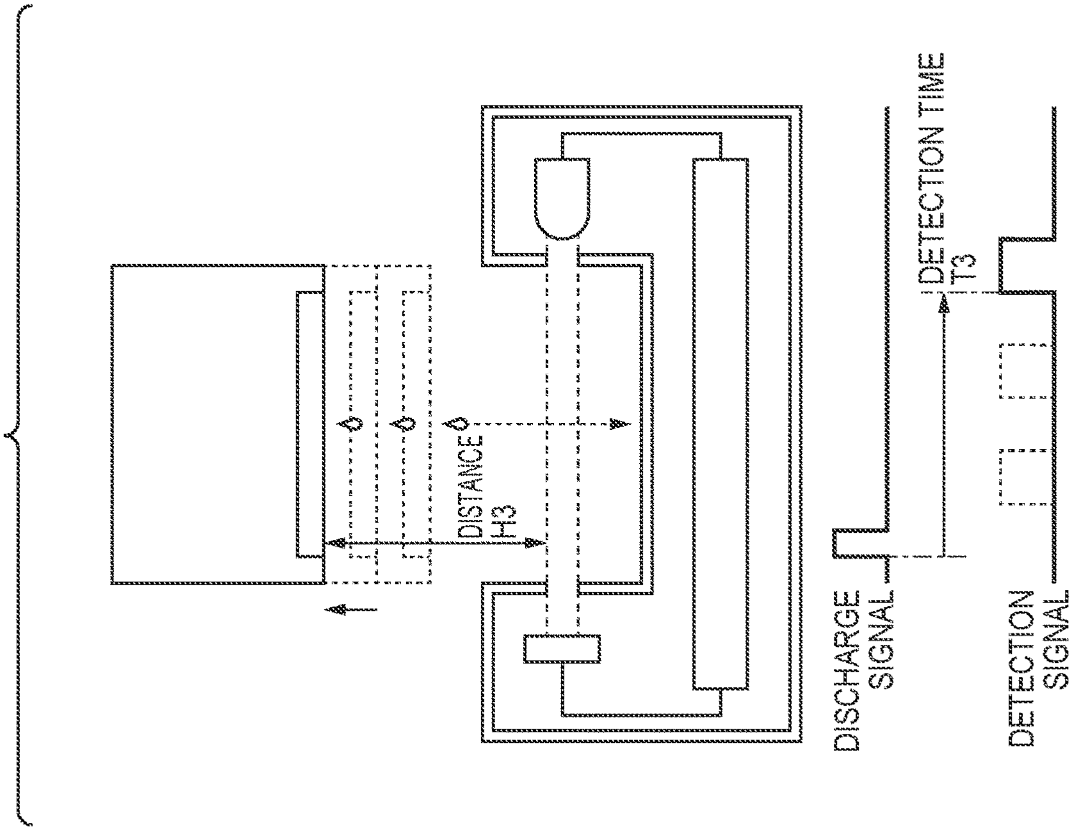

FIG. 5C is a view illustrating a state in which the lift motor 211 is driven, and the distance between the printhead 201 and the discharge speed detection sensor 205 is further separated, as compared to FIG. 5B, to be a third distance H3.

Similarly to the cases of FIGS. 5A and 5B, the timing at which the ink droplet passes through the light flux 404 and the light reception amount of the light-receiving element 402 changes is output as a detection signal. Due to this, detection time T3 from when the discharge signal is given off to the printhead 201 to when the detection signal is output is detected. This detection time T3 corresponds to the time during which the ink droplet flies by the distance H3 from the printhead 201 to the discharge speed detection sensor 205.

Thus, from FIGS. 5B and 5C, discharge speed V2 of the ink droplet is calculated as follows based on the distance difference between the second distance H2 and the third distance H3 and the difference between the detection times T2 and T3.

$$V2=(H3-H2)/(T3-T2)$$

Figure 5D:
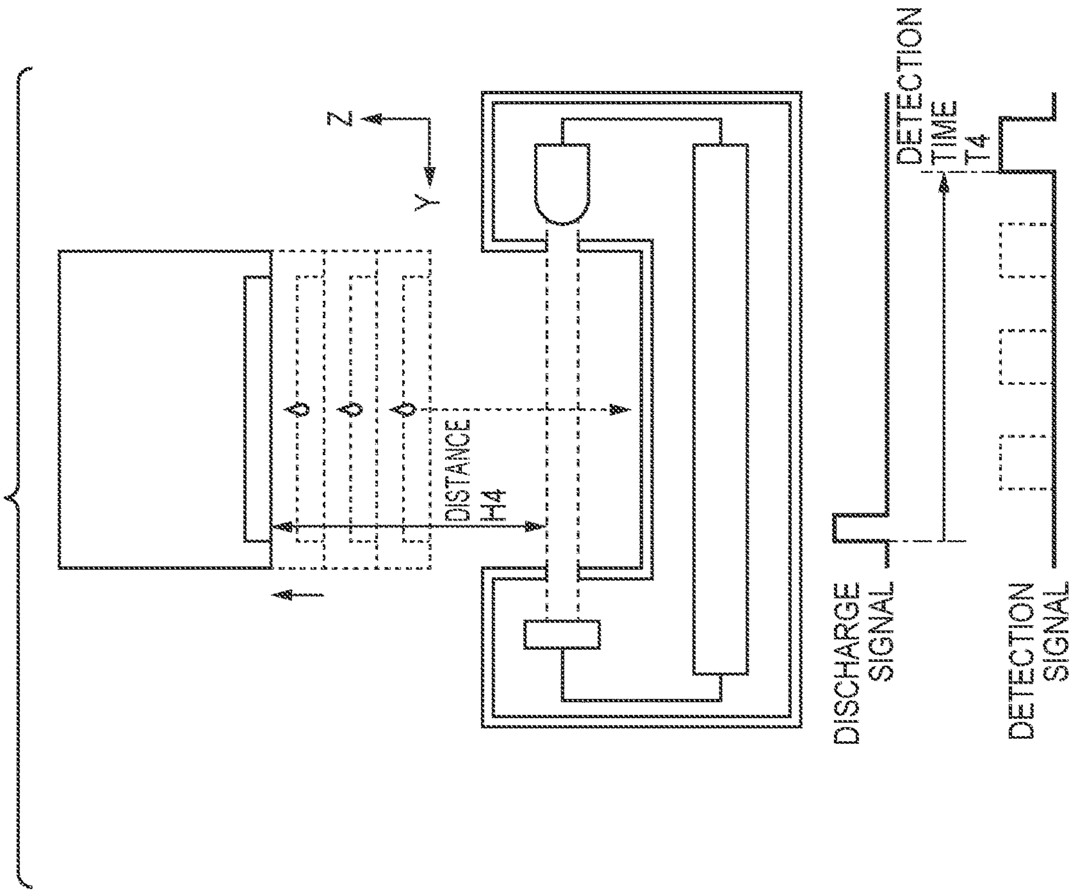

FIG. 5D is a view illustrating a state in which the lift motor 211 is driven, and the distance between the printhead 201 and the discharge speed detection sensor 205 is further separated, as compared to FIG. 5C, to be a fourth distance H4.

Similarly to the cases of FIGS. 5A to 5C, the timing at which the ink droplet passes through the light flux 404 and the light reception amount of the light-receiving element 402 changes is output as a detection signal. Due to this, detection time T4 from when the discharge signal is given off to the printhead 201 to when the detection signal is output is detected. This detection time T4 corresponds to the time during which the ink droplet flies by the distance H4 from the printhead 201 to the discharge speed detection sensor 205.

Thus, from FIGS. 5C and 5D, discharge speed V3 of the ink droplet is calculated as follows based on the distance difference between the third distance H3 and the fourth distance H4 and the difference between the detection times T3 and T4.

$$V3=(H4-H3)/(T4-T3)$$

As described above, discharge speed V of the ink droplet corresponding to each distance is calculated based on each distance in which the printhead 201 and the discharge speed detection sensor 205 are separated. The plurality of calculated discharge speeds of the ink droplets are stored as an average value thereof or as a speed corresponding to the distance between the printhead 201 and the printing sheet.

The distance between the printhead 201 and the discharge speed detection sensor 205 can be further separated by the lift motor 211. This makes it possible to measure more separated distances and detection times of the respective ink droplets, and possible to calculate the discharge speed of the ink droplets more accurately. On the other hand, it is possible to reduce the distance in which the printhead 201 and the discharge speed detection sensor 205 are separated by the lift motor 211 and the number of times of changing the distance, and shorten the time required for detection of the discharge speed of ink droplets.

As described above, by providing a lifting and lowering unit configured to change the distance from the printhead 201 to the printing paper in a plurality of stages and detecting the ink discharge speed variation in each stage, it becomes possible to detect the ink discharge speed with high accuracy.

Next, monitoring of variation in the discharge state of an ink droplet will be described. The discharge state of an ink droplet may change when the ink droplet is discharged from the printhead. On the other hand, since there is no change with discharge of several ink droplets, the discharge state may be monitored about once in several pages as a guide. Note that, specifically, by performing the monitoring in a page interval or in a scan interval during printing, it is possible to hardly affect productivity. However, the monitoring performing timing is not limited to this.

Figure 6:
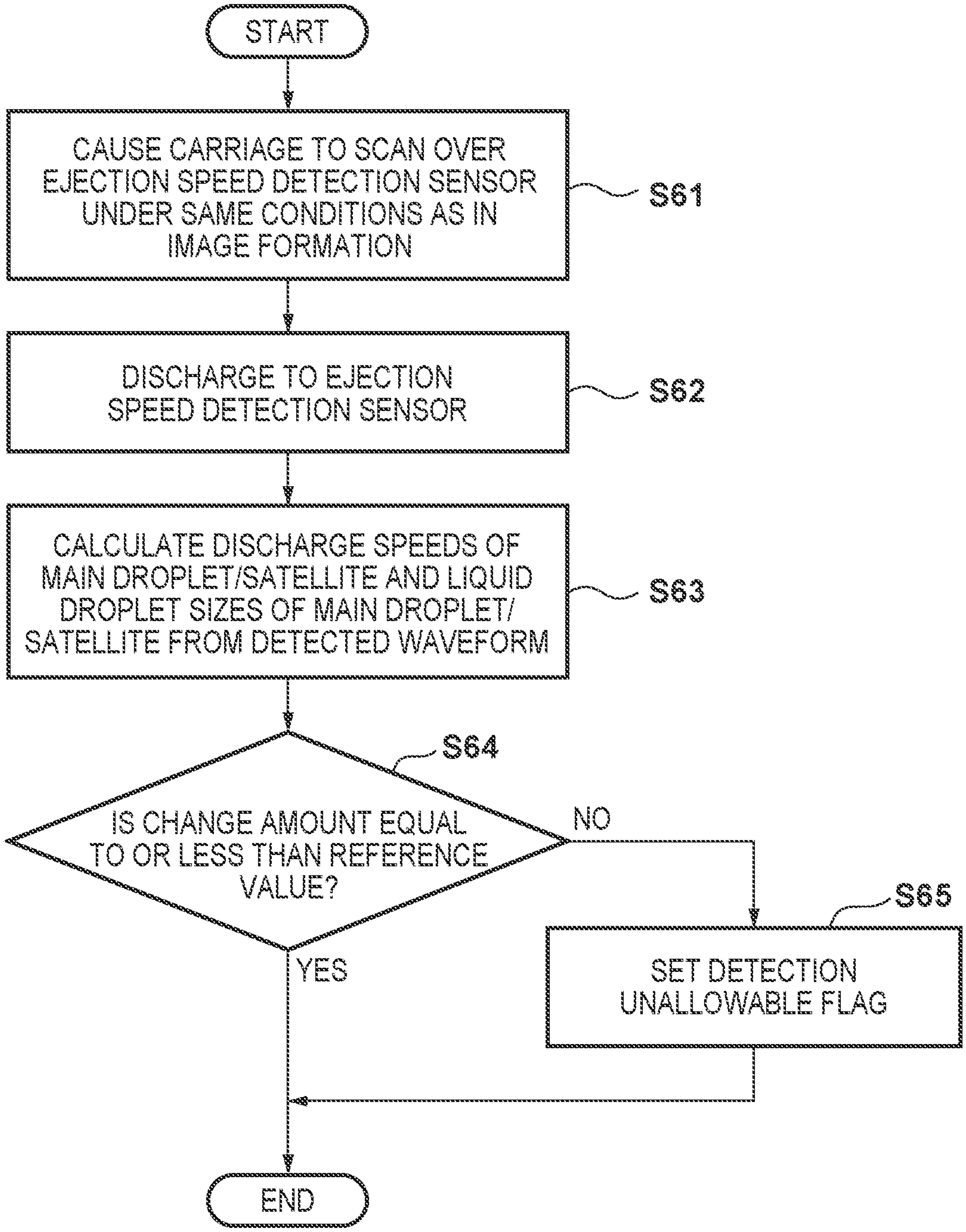
FIG. 6 is a flowchart illustrating a discharge state monitoring sequence.

FIG. 6 is a flowchart showing the operation of monitoring the discharge state of an ink droplet. The operation of this flowchart is implemented by the CPU 301 executing a program stored in the memory 303 or the like.

First, in step S61, the CPU 301 causes the carriage 202 to scan under the same conditions as in image formation, and causes the carriage to pass over the discharge speed detection sensor 205. The same conditions as in image formation means that the drive of the main body of the printing apparatus 100 and the head drive have the same conditions. The driving of the main body includes a height of the carriage, the driving speed of the carriage, and control. The carriage driving speed includes an acceleration region and a constant speed region. However, most printing is performed in the constant speed region, and therefore it is desirable that discharge monitoring is also performed in the constant speed region. The head drive includes block drive and a discharge pulse width. In order to monitor the change in the landing state of the discharge ink droplets formed on the paper surface, the carriage 202 is driven under the same conditions as the image formation conditions, specifically, under the same conditions as the image formation conditions in terms of the carriage and the paper height and the scanning speed.

Figure 7:
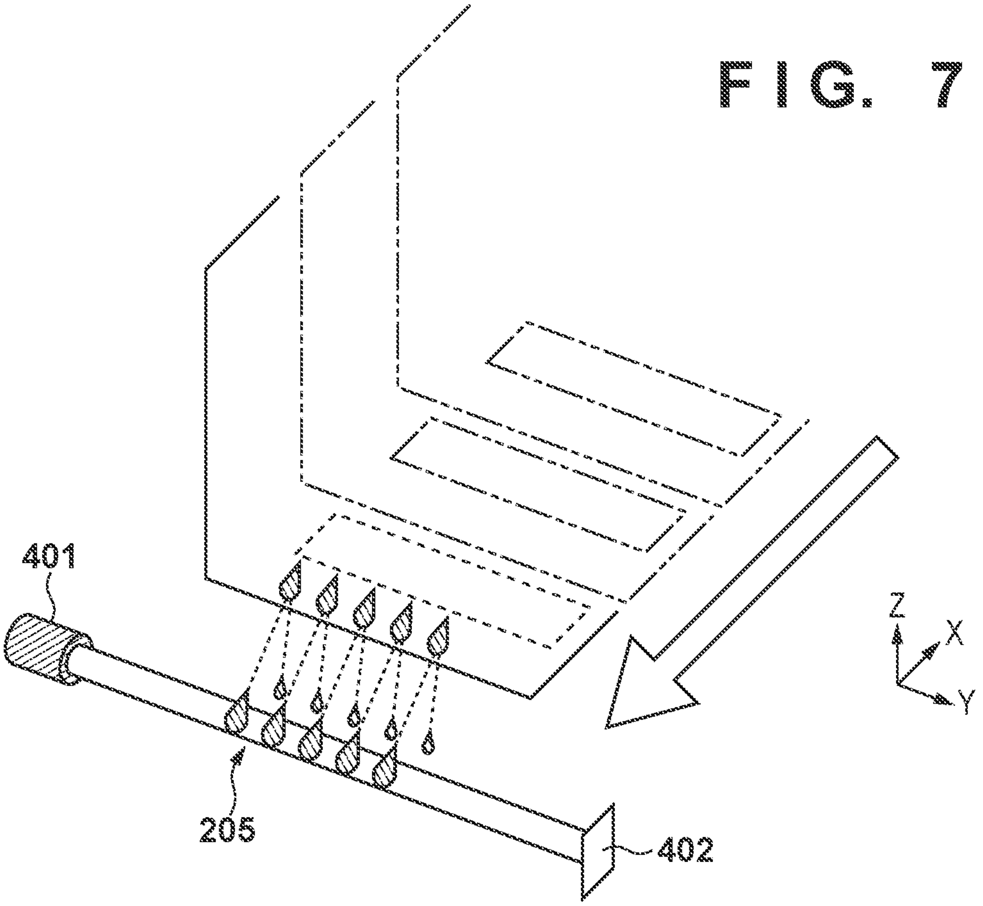
FIG. 7 is a conceptual view illustrating an operation of performing discharge detection while driving a carriage.

FIG. 7 is a view illustrating a concept of monitoring the discharge state while the carriage 202 is being driven.

The ink droplet discharged from the printhead 201 is discharged being separated into a main droplet and a small ink droplet (hereinafter referred to as satellite) other than the main droplet, depending on the discharge conditions. At the time of discharge, the main droplet and the satellite are discharged from the same position, but the landing position on the paper surface may vary depending on a difference in discharge speed. In order to detect a change in the landing position and the landing dot shape on the paper surface, discharge monitoring is performed under the same conditions as those in image formation. The discharge conditions are preferably identical, but do not necessarily need to be the same in order to detect a change.

Figure 8A:
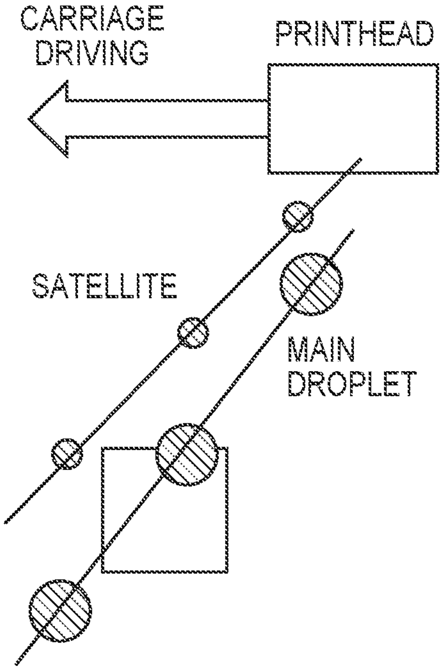
FIGS. 8A and 8B are views for explaining a difference between a drive state of the carriage and a non-drive state of the carriage.
Figure 8B:
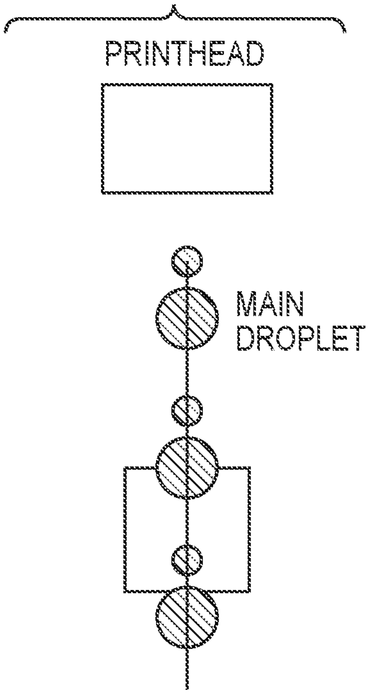

FIGS. 8A and 8B are views for explaining a difference between discharge detection at the time of driving the carriage and discharge detection at the time of not driving the carriage. FIG. 8A illustrates a state of performing discharge detection while the carriage 202 is being driven. FIG. 8B illustrates a state of performing discharge detection while the carriage 202 is being stopped.

The ink droplets discharged from the nozzles are different in discharge size and discharge speed between the main droplet and the satellite. When the discharge detection is performed while the carriage 202 is being driven, it becomes possible to separate and detect the main droplet and the satellite. Therefore, by performing the detection while the carriage 202 is being driven, it is possible to detect a change in the discharge size and a change in the discharge speed of the main droplet, as well as a change in the discharge size and a change in the discharge speed of the satellite. FIG. 8A illustrates a state in which the main droplet and the satellite are separated and only the main droplet is detected. It may also be possible to detect only the satellite by shifting the discharge timing. The main droplet and the satellite may be caused to simultaneously pass through a detection unit and separated depending on the timing of detection by the detection unit.

In step S62, the CPU 301 causes the ink droplets to be discharged such that the ink droplets cross the light flux 404 of the discharge speed detection sensor 205 while causing the carriage 202 to scan under the same conditions as those in image formation.

In step S63, the CPU 301 calculates the discharge speeds of the main droplet and the satellite, and the ink droplet sizes of the main droplet and the satellite from the detection waveforms of the discharge speed detection sensor 205.

Figure 9A:
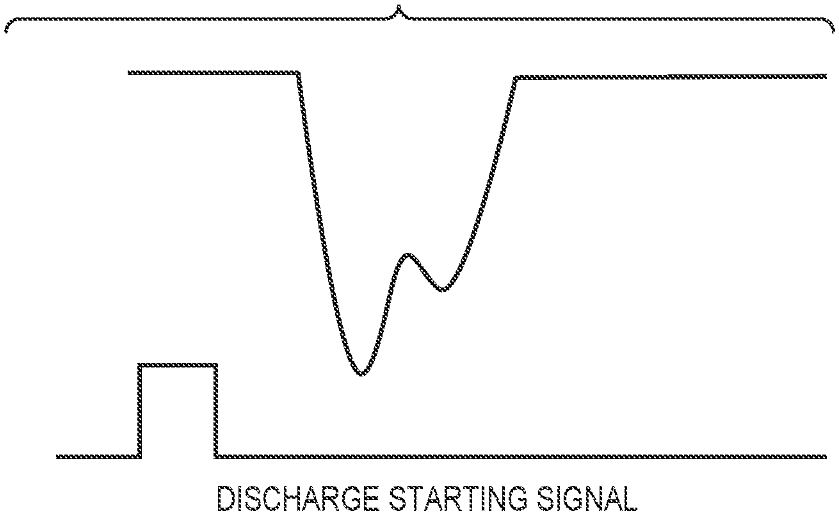
FIGS. 9A to 9D are schematic views for explaining calculation of a discharge speed and a discharge amount.
Figure 9B:
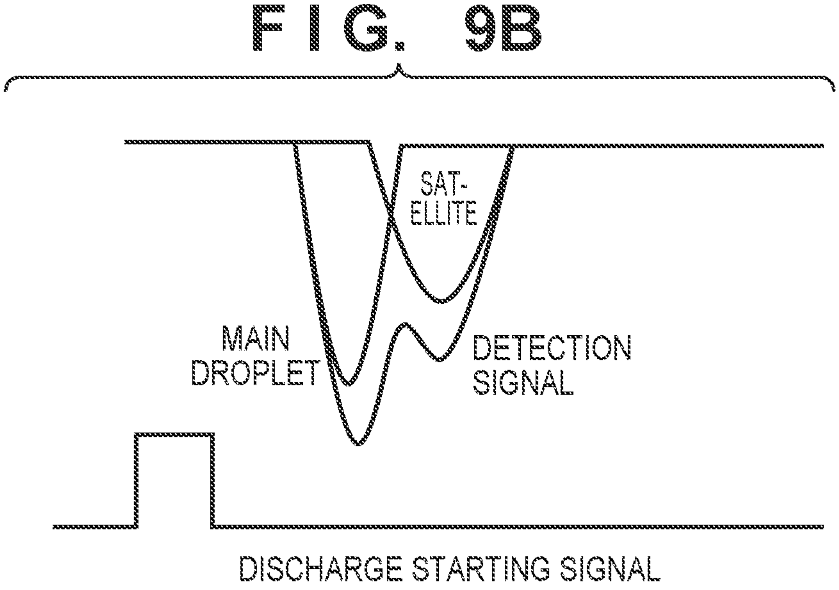

When the ink droplet passes through the discharge speed detection sensor 205, the signal at the time of passing changes as described with reference to FIGS. 4A and 4B. FIGS. 9A to 9D are schematic views each illustrating calculation of the discharge speed and the discharge amount. FIG. 9A illustrates a detection signal. The signal that changes when the main droplet and the satellite pass through the discharge speed detection sensor 205 is affected by the distribution of the discharge speed of the ink droplets discharged simultaneously. The change in the discharge speed has a correlation with the ink droplets discharged for printing from the nozzle. Therefore, when a plurality of ink droplets are used for detection, unevenness in the distribution is reduced by selecting nozzles of the same amount of ink. As illustrated in FIG. 9B, function approximation is performed on an assumption that the main droplets and the satellites are normally distributed.

This function approximation is not necessarily performed with a normal distribution, and may be a polynomial approximation. Since the main droplet always has a speed equal to or higher than that of the satellite, the waveform at the head on the time axis of the two normal distribution results is the waveform of the main droplet, and the other is the waveform of the satellite.

Figure 9C:
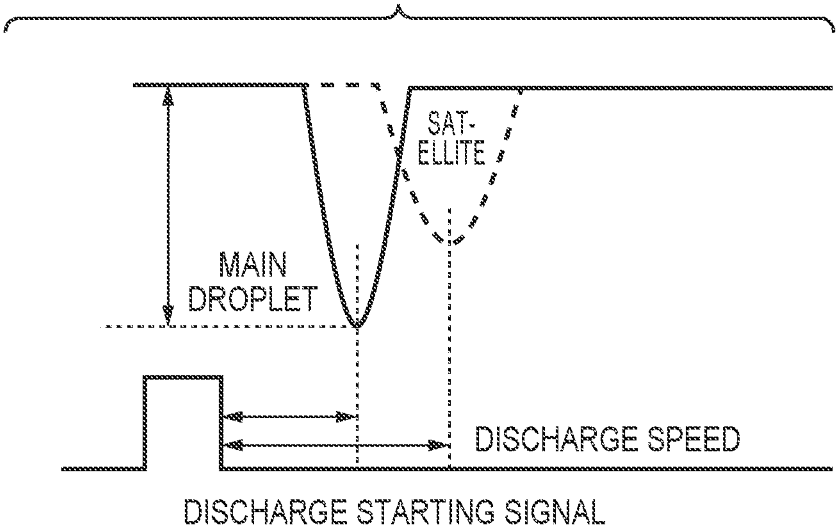

FIG. 9C is a conceptual view of calculating the discharge speed and the discharge amount from the separated main droplet. The time from the start of discharge to the detection is calculated. Since the distance between the carriage 202 and the discharge speed detection sensor 205 is known, the discharge speed can be calculated. Since the discharge monitoring is a function of detecting a variation from the initial stage, the accuracy of detecting the absolute value of the distance between the carriage 202 and the discharge speed detection sensor 205 is not necessary. For example, when the initial discharge speed is 18 m/s, it is not necessary to have high detection accuracy of 18 m/s, and it is sufficient that a change of 0.5 m/s can be detected as a change amount after use. The discharge amount is determined from the magnitude of the signal change. This discharge amount can be implemented by obtaining a relationship between the signal change amount and the discharge amount in advance.

Figure 9D:
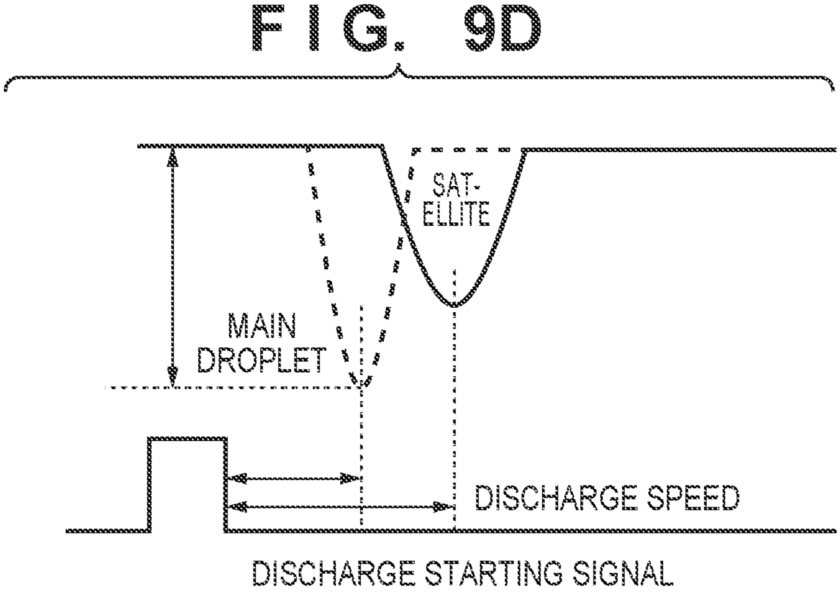

FIG. 9D is a conceptual view in which the discharge speed and the discharge amount are calculated from the separated satellite. Similarly to the main droplet, the discharge speed and the discharge amount of the satellite can be calculated. When the discharge speed changes, the landing position on the paper surface deviates. In this case, for example, when an image is formed with one vertical line, an image defect in which the line becomes thick or one line becomes two lines occurs. Similarly, when the discharge size changes, the image density formed on the paper surface changes. For example, in a case where magenta and cyan are superimposed to form an image, the density balance changes, and an image defect occurs. The CPU 301 calculates the discharge speed and the ink droplet size based on the detection value of the discharge speed detection sensor 205.

In step S64, by comparing an initial or predetermined discharge state with the current discharge state, the CPU 301 determines whether or not the change amount of the discharge speed and the discharge amount is equal to or less than a reference value.

The discharge monitoring is performed with the time of printer adjustment as a start point, specifically, at the time point when registration adjustment (also referred to as landing position adjustment) or density adjustment (referred to as color calibration) is performed. The discharge speed and the discharge amount when the adjustment is performed are detected and recorded in the memory in the printer. Thereafter, the discharge speed and the discharge amount at the start point are compared at the timing detected as the discharge monitoring. The start point is updated at the timing when the registration adjustment or the density adjustment is performed.

In step S64, each of the discharge speed and the discharge amount of the main droplet or the satellite is compared, and when even any one of them changes by a certain amount or more, there is a possibility that the image quality is affected. A reference value at which an image defect is likely to occur is set in advance. When the change amount of the discharge speed and the discharge amount of the main droplet or the satellite is larger than the reference value, the processing proceeds to step S65, a detection unallowable flag is turned on and the discharge speed and the discharge amount are stored in the memory in the printer, and the processing ends. When it is determined that the change amount is equal to or less than the reference value, the processing ends.

When the detection unallowable flag is on after the processing of FIG. 6 ends, adjustment of discharge is notified to the user to prompt the adjustment. The main body of the printing apparatus 100 may automatically perform image adjustment. As a method for prompting the adjustment, display on a panel mounted on the printing apparatus 100 is convenient, but the adjustment may be notified to the manager via a network. As the automatic adjustment, registration adjustment or density adjustment mounted on the printing apparatus 100 may be executed. However, the means for automatic adjustment is not limited to the above adjustment. By performing the above discharge monitoring, a state change in discharge can be detected.

Supplementary description will be given regarding the operation of causing the carriage 202 to scan under the same conditions as those of the image formation in step S61 of FIG. 6 and causing the carriage to pass over the discharge speed detection sensor 205.

The discharge speed detection sensor 205 differs from an ink droplet detection sensor that detects non-discharge in terms of the optical system configuration, purpose of implementation, and function, but is preferably used also as the ink droplet detection sensor from the viewpoint of the number of hardware components. Therefore, as one embodiment, the ejection speed detection sensor 205 is used also as the ink droplet detection sensor arranged outside the printing scan region.

On the other hand, the discharge monitoring can be performed during printing operation. In this case, movement to the ink droplet detection sensor arranged outside the printing scan region causes a decrease in the printing throughput. Therefore, a method of using the discharge speed detection sensor 205 also as a spare discharge means arranged closest to the printing region may be selected. By arranging the discharge speed detection sensor 205 in a region that is usually passed at the time of printing, it is possible to perform discharge monitoring without decreasing the print throughput.

Although there has already been described the method of calculating, from the detected waveform, the discharge speeds and the liquid droplet sizes of the main droplet and the satellite illustrated at step S63 of FIG. 6, a supplementary description of another method will be added below.

In a case where a liquid droplet is separated into the main droplet and the satellite, when the liquid droplet passes through the discharge speed detection sensor 205, the main droplet and the satellite shield the light flux in a very small time after the main droplet only shielded the light flux. As a result, the detection signal of the discharge speed detection sensor 205 is a waveform having two peak values (local minimum value) as illustrated in FIG. 9A. This can be regarded as a combination of the detection signals of the main droplet and the satellite. In order to calculate the discharge speed and the liquid droplet size each for the main droplet and the satellite, it is necessary to separate into the detection signal of the main droplet and the detection signal of the satellite.

A peak fitting method is known as a technique for separating a detection signal. This is a method in which a calculation is repeated until a synthetic spectrum of waveforms calculated by a Gaussian function or a Lorentzian function by providing a peak value or a half-width to the Gaussian function or the Lorentzian function matches with the actual spectrum. For example, when the detection signal of a main droplet alone or a satellite alone can be approximated by a Gaussian function, waveforms can be separated as illustrated in FIG. 9B by peak fitting using the Gaussian function. After the waveform separation, the discharge speed and the liquid droplet size can be calculated each for the detection signal of the main droplet and the detection signal of the satellite, from the difference of the reaching time from the discharge starting signal to the peak, and from the peak value.

Here, the approximation function of detection signals is not limited to the Gaussian function, and may be a Lorentz function, a polynomial function, or the like. In addition, the technique for separating detection signals is not limited to the peak fitting method, and may be the nonlinear least-square method, or the like.

Supplementary description will be added regarding the determination of whether or not the change amount is equal to or less than the reference value in step S64 of FIG. 6.

The discharge monitoring is intended to detect a change from a state determined to be correct. Start points determined to be correct include a state of initial installation of the printing apparatus 100. Other start points include a state immediately after the head is replaced and a state after the discharge landing position is adjusted. In each state, the discharge state is detected, and this value is stored as a predetermined discharge state. When the change amount from this predetermined discharge state becomes equal to or greater than a certain value, it is determined to be discharge state failure.

Supplementary description will be added for the method of setting the detection unallowable flag at step S65 of FIG. 6.

A method of performing automatic adjustment when discharge variation is detected may include a method of performing discharge landing position adjustment. This can be realized by detecting a pattern printed on the printing medium.

As another technique, a method of calculating the discharge timing from the discharge variation amount may also be used. The displacement amount of the landing position due to variation of discharge speed can be calculated from head-sheet interval, carriage scanning speed, and discharge speed. Using this method allows for reducing waste paper due to printing.

In addition, a method of recovering the discharge speed may include head cleaning, or foreign matter removal by electric potential. Whether or not the discharge speed has recovered can be detected by the method described above.

Method for Selecting Nozzle for Discharge Monitoring

In discharge monitoring, a method may be used for the purpose of improving the detection sensitivity (S/N ratio) of the sensor, in which a plurality of nozzles are used to increase the light shielding amount for the sensor in the light flux cross section, thereby the change degree and the variation component of the light amount are increased. However, the aforementioned method may adversely affect the detection sensitivity when there is a non-discharging nozzle among the nozzles to be used. Although detection of non-discharging is performed for all the nozzle rows in discharge inspection of the nozzles of the printhead, it is determined to be normal when a number of non-discharging nozzles is less than a threshold value, and therefore one or more non-discharging nozzles may be included in the nozzle group to be used for discharge monitoring. There is problem that accurate detection of the flying state of ink liquid droplet cannot be performed when a large number of non-discharging nozzles are included in a nozzle group to be used. With regard to the nozzles to be used, it is desirable to select nozzles having similar use frequency, in order to reduce deviation of distribution, as has been described above.

In the technique according to the present embodiment, by excluding non-discharging nozzles from the nozzle group to be used for discharge monitoring, detection of the flying state of an ink droplet discharged from the printhead 201 is stabilized and the possibility of occurrence of an image defect is accurately determined before performing printing.

In the printing operation by the printhead, the nozzles are divided into several groups to discharge at drive timings shifted for each group, for the purpose of power saving and suppressing the influence of airflow from adjacent nozzles.

Figure 10A:
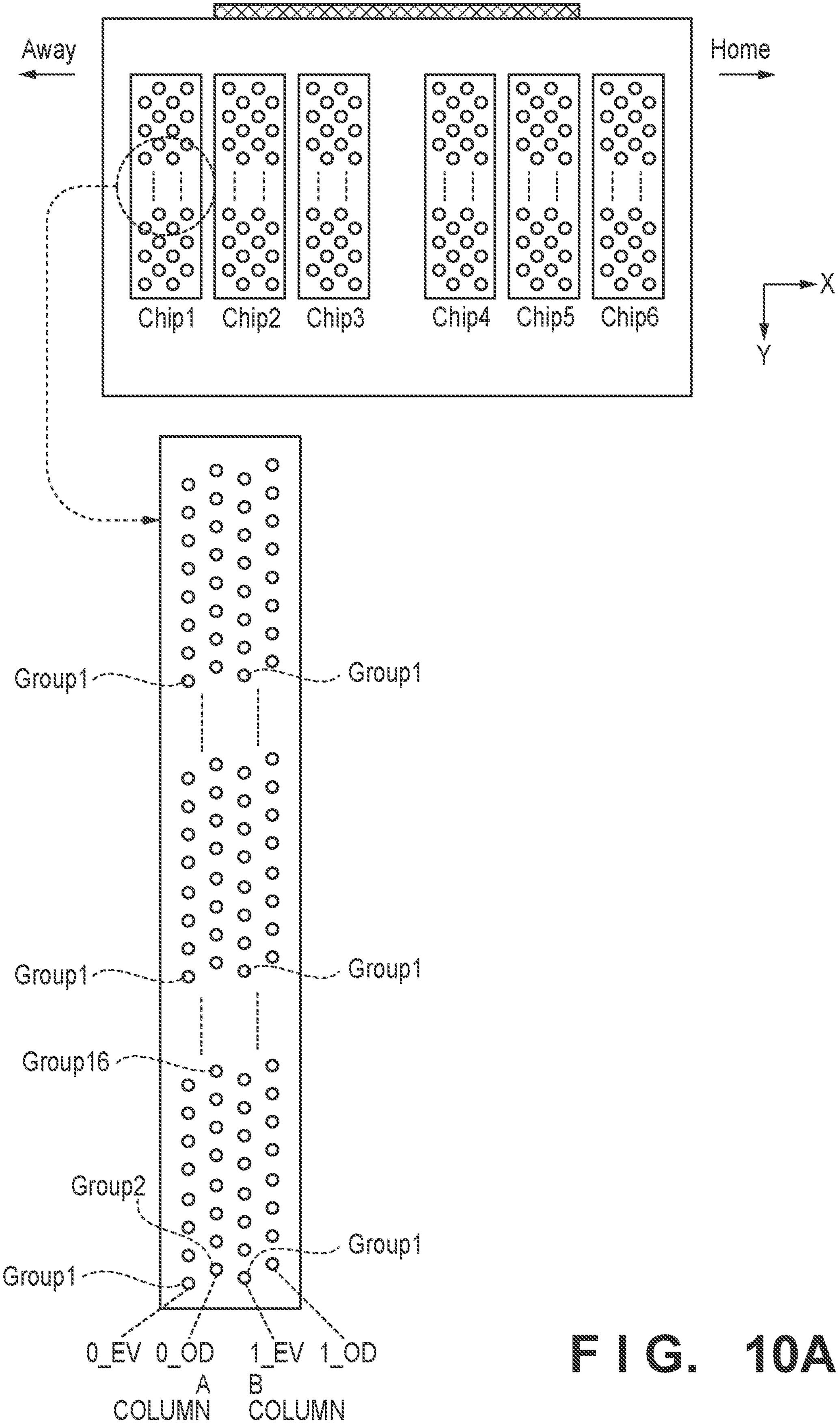
FIG. 10A is a schematic view for explaining grouped nozzle groups.
Figure 10B:
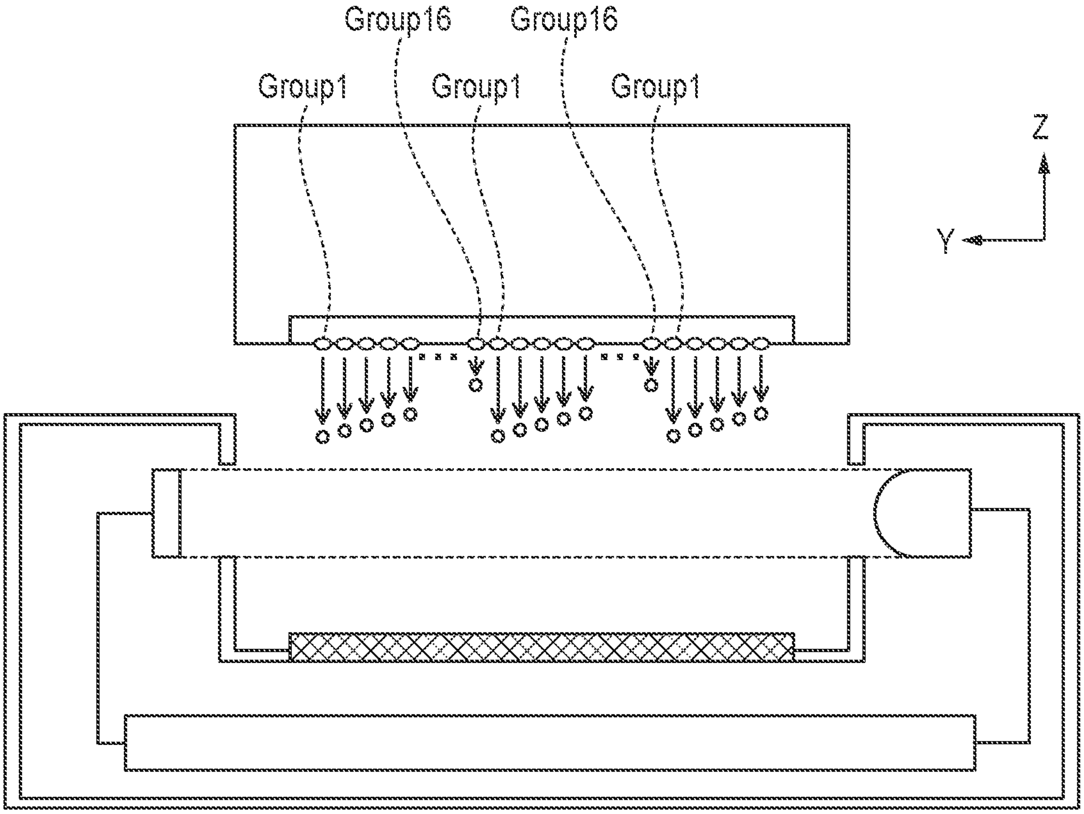
FIG. 10B is a schematic view for explaining grouped nozzle groups.

FIG. 10A is a schematic view illustrating printheads grouped for each drive timings, and FIG. 10B is a schematic view illustrating a method of discharging at shifted drive timings. For example, in a case where a head including a total of N nozzles is divided into 16 groups, the number of nozzles per group is N/16 and thus current consumption per drive timing can be suppressed to that of N/16 nozzles at most. In the present embodiment, these groups are defined and described as nozzle groups.

Figure 11:
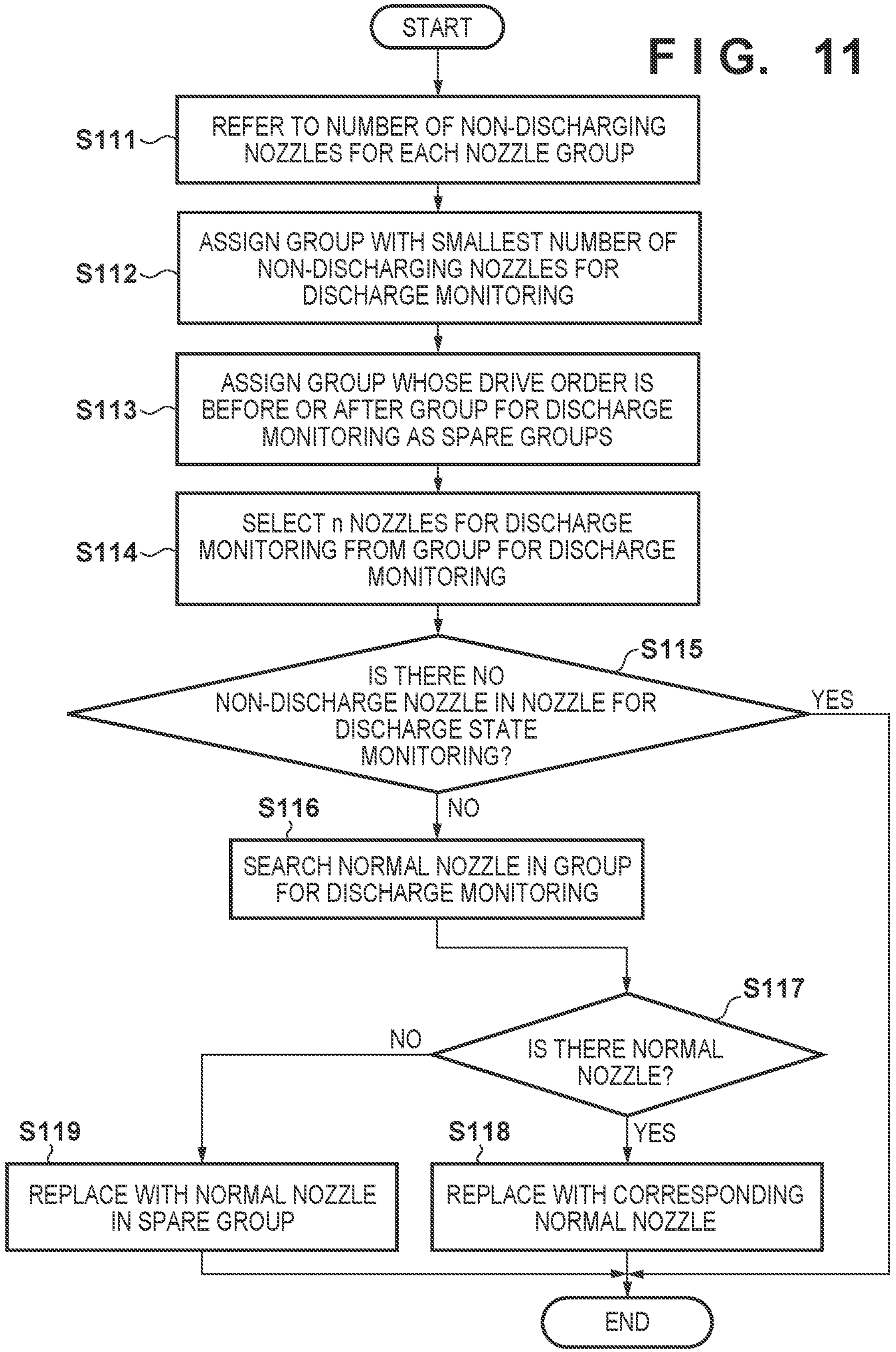
FIG. 11 is a flowchart illustrating a selection operation of a nozzle for discharge monitoring according to the first embodiment.

FIG. 11 is a flow chart illustrating a selection operation of a nozzle for discharge monitoring according to the present embodiment. The operation is performed at an arbitrary timing prior to the discharge monitoring flow illustrated in FIG. 6, such as when the apparatus is activated, when a printhead is replaced, or immediately before the discharge monitoring is performed.

First, at step S111, the CPU 301 refers to the number of non-discharging nozzles for each nozzle group stored in the memory in the printhead 201.

At step S112, the CPU 301 assigns a nozzle group including the minimum number of non-discharging nozzles to the nozzles for discharge monitoring.

At step S113, the CPU 301 assigns a spare group for discharge monitoring. Specifically, as for a spare group, a group is desired which has less deviation in a drive timing from that of the nozzle group assigned at step S112 for discharge monitoring, and therefore a nozzle group of drive order being in anterior or posterior relation is assigned as a spare group for discharge monitoring.

At step S114, the CPU 301 selects n (predetermined number) nozzles for discharge monitoring from the nozzle group for discharge monitoring. The number of nozzles to be selected here is set to an appropriate value from 20 to 30, in accordance with specifications of the printhead 201 and the printing apparatus 100, and a specification of detection sensitivity required for discharge monitoring.

At step S115, the CPU 301 refers to the information stored in the memory in the printhead 201 about the n nozzles for discharge monitoring selected at step S114, and terminates the nozzle selection flow when there is no non-discharging nozzle. When there exists a non-discharging nozzle, the processing proceeds to step S116, and the CPU 301 searches for a normal nozzle from nozzles in the same group other than the n nozzles selected at step S114. At step S117, when there exists a normal nozzle, the processing proceeds to step S118, and the CPU 301 replaces the non-discharging nozzle with the aforementioned normal nozzle, and subsequently terminates the nozzle selection flow. At step S117, when there is no normal nozzle, the processing proceeds to step S119, and the CPU 301 replaces the non-discharging nozzle with a normal nozzle in the spare group, and subsequently terminates the nozzle selection flow.

As has been described above, the present embodiment excludes the non-discharging nozzle from the nozzle group used for discharge monitoring. Accordingly, detection of a flying state of an ink droplet discharged from the printhead can be stabilized, and the possibility of occurrence of an image defect can be more accurately determined before performing printing.

Second Embodiment

Next, a second embodiment will be described. Here, description of similar parts to those of the first embodiment will be partially omitted.

Figure 12:
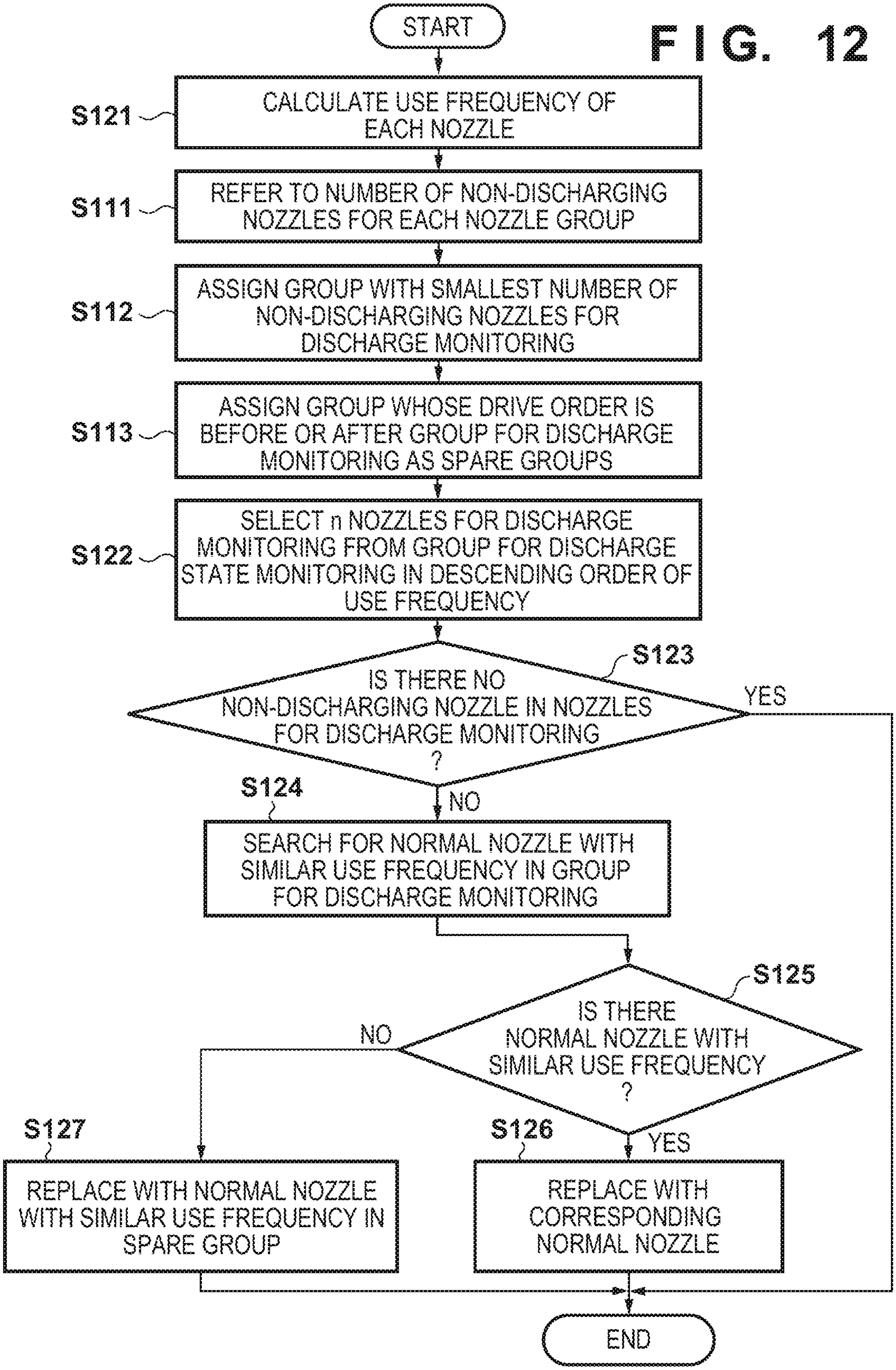
FIG. 12 is a flowchart illustrating a selection operation of a nozzle for discharge monitoring according to a second embodiment.

FIG. 12 is a flow chart illustrating a selection operation of a nozzle for discharge monitoring according to the present embodiment. Since the flowchart of FIG. 12 includes many parts common with those in FIG. 11 illustrating the first embodiment, steps performing a same operation are provided with same step numbers, and description thereof will be omitted.

First, at step S121, the CPU 301 refers to the number of discharge times of each nozzle preliminarily stored in the memory in the printhead 201, and calculates the use frequency of each nozzle at that time.

Steps S111 to S113 are identical to steps S111 to S113 in FIG. 11.

At step S122, the CPU 301 selects, as the nozzles to be used, n nozzles in descending order of the use frequency in the group assigned for discharge monitoring at step S112. The number of nozzles to be selected here is set to an appropriate value in accordance with specifications of the printhead and the printing apparatus and a specification of the detection sensitivity required for discharge monitoring.

At step S123, the CPU 301 refers to the information stored in the memory in the printhead 201 about the n nozzles for discharge monitoring selected at step S122, and terminates the nozzle selection flow when there is no non-discharging nozzle. When there exists a non-discharging nozzle, the processing proceeds to step S124, and the CPU 301 searches for a normal nozzle with a similar use frequency from the nozzles in the same group other than the n nozzles selected at step S122. At step S125, when there exists a normal nozzle with a similar use frequency, the processing proceeds to step S126, and the CPU 301 replaces the non-discharging nozzle with the aforementioned normal nozzle, and subsequently terminates the nozzle selection flow. At step S125, when there is no normal nozzle with a similar use frequency, the processing proceeds to step S127, and the CPU 301 replaces the non-discharging nozzle with a normal nozzle with a similar use frequency in the spare group, and subsequently terminates the nozzle selection flow.

As has been described above, the present embodiment excludes the non-discharging nozzle from the nozzle group used for discharge monitoring, and preferentially selects nozzles of high use frequency as nozzles to be used.

Accordingly, it becomes possible to perform discharge monitoring in accordance with the actual usage of nozzles in the printhead.

Third Embodiment

Next, a third embodiment will be described. Here, description of similar parts to those of the first and the second embodiments will be partially omitted.

Figure 13:
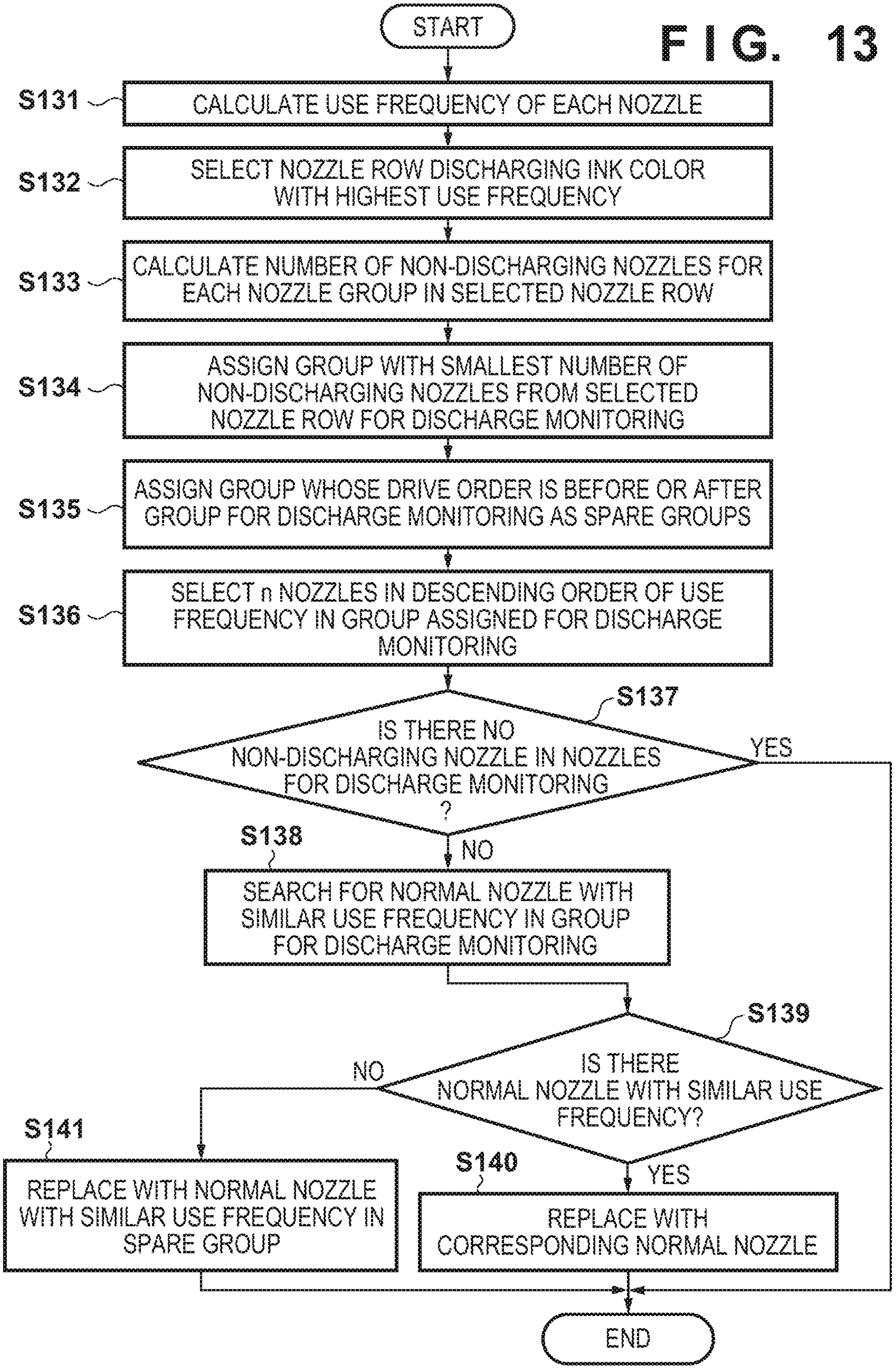
FIG. 13 is a flowchart illustrating a selection operation of a nozzle for discharge monitoring according to a third embodiment.

FIG. 13 is a flow chart illustrating a selection operation of a nozzle for discharge monitoring according to the present embodiment.

First, at step S131, the CPU 301 refers to the number of discharge times of each nozzle preliminarily stored in the memory in the printhead 201, and calculates the use frequency of each nozzle at that time.

At step S132, the CPU 301 selects the nozzle row that discharges the ink color of highest use frequency.

At step S133, the CPU 301 refers to the number of non-discharging nozzles stored in the memory in the printhead 201, and calculates, for the nozzle row selected at step S132, the number of non-discharging nozzles for each nozzle group.

At step S134, the CPU 301 assigns, as a nozzle group for discharge monitoring, a nozzle group including the minimum number of non-discharging nozzles in the nozzle rows selected at step S132.

At step S135, the CPU 301 assigns a spare group for discharge monitoring. Specifically, as for a spare group, a group is desired which has less deviation in a drive timing from that of the nozzle group assigned at step S134 for discharge monitoring, and therefore a nozzle group of drive order being in anterior or posterior relation is assigned as a spare group for discharge monitoring.

At step S136, the CPU 301 selects, as the nozzles to be used, n nozzles in descending order of the use frequency in the group assigned for discharge monitoring at step S134. The number of nozzles to be selected here is set to an appropriate value in accordance with specifications of the printhead and the printing apparatus and a specification of the detection sensitivity required for discharge monitoring.

At step S137, the CPU 301 refers to the information stored in the memory in the printhead 201 about the n nozzles for discharge monitoring selected at step S136, and terminates the nozzle selection flow when there is no non-discharging nozzle.

When there is a non-discharging nozzle, the processing proceeds to step S138, and the CPU 301 searches for a normal nozzle with a similar use frequency from the nozzles in the same group other than the n nozzles selected at step S136. When there exists a normal nozzle with a similar use frequency at step S139, the processing proceeds to step S140, and the CPU 301 replaces the non-discharging nozzle with the aforementioned normal nozzle, and subsequently terminates the nozzle selection flow. When there is no normal nozzle with a similar use frequency at step S139, the processing proceeds to step S141, and the CPU 301 replaces the non-discharging nozzle with a normal nozzle with a similar use frequency in the spare group, and subsequently terminates the nozzle selection flow.

As has been described above, the present embodiment excludes the non-discharging nozzle from the nozzle group used for discharge monitoring, and selects nozzles to be used from the nozzle row of high use frequency. Accordingly, it becomes possible to perform discharge monitoring in accordance with the actual usage of ink colors in the printhead.

Fourth Embodiment

Next, a fourth embodiment will be described. Here, description of similar parts to those of the first to the third embodiments will be partially omitted.

Figure 14:
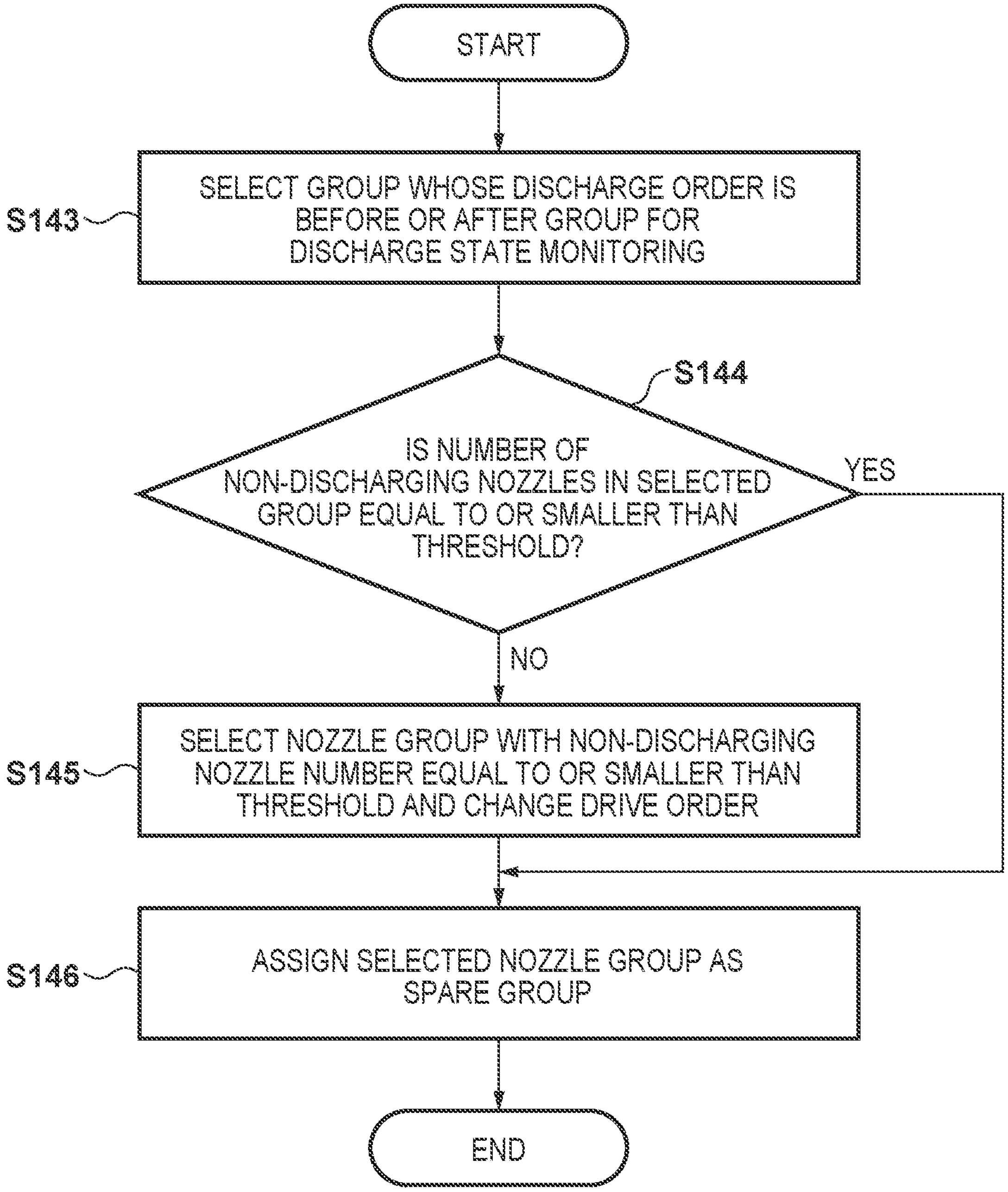
FIG. 14 is a flowchart illustrating a selection operation of a nozzle for discharge monitoring according to a fourth embodiment.

FIG. 14 is a flow chart illustrating a selection operation of a spare group for discharge monitoring according to the present embodiment. In the first to the third embodiments, a nozzle group of drive order being in anterior or posterior relation with respect to the nozzle group for discharge monitoring has been assigned as a spare group at steps S113 and S135. In contrast, the present embodiment changes the nozzle group to be assigned depending on the number of non-discharging nozzles.

At step S143, the CPU 301 selects, as a candidate spare group, a nozzle group of drive order being in anterior or posterior relation with respect to the nozzle group for discharge state monitoring.

At step S144, the CPU 301 determines whether or not the number of non-discharging nozzles in the selected nozzle group is equal to or smaller than a threshold value (equal to or smaller than a predetermined value) and, when the number is equal to or smaller than the threshold value, the processing proceeds to step S146, otherwise the processing proceeds to step S145.

At step S145, the CPU 301 selects another nozzle group including an equal to or smaller number of non-discharging nozzles than the threshold value, and assigns the selected nozzle group as a spare group with changing the drive order. Here, the threshold value of the number of non-discharging nozzles is set in accordance with the specifications of the printhead and the printing apparatus within a range that does not affect the non-discharge complementary control which is performed at steps S115 to S119 in FIG. 11, steps S123 to S127 in FIG. 12, and steps S137 to S141 in FIG. 13.

At step S146, the CPU 301 assigns the nozzle group selected at step S143 or step S145 as a spare group.

As has been described above, the present embodiment preferentially assigns a nozzle group including only a small number of non-discharging nozzles as a spare group, so thereby it becomes possible to shorten the execution time of non-discharge complementary control in the selection flow of nozzles to be used.

Fifth Embodiment

Next, a fifth embodiment will be described. Here, description of similar parts to those of the first to the fourth embodiments will be partially omitted.

Figure 15:
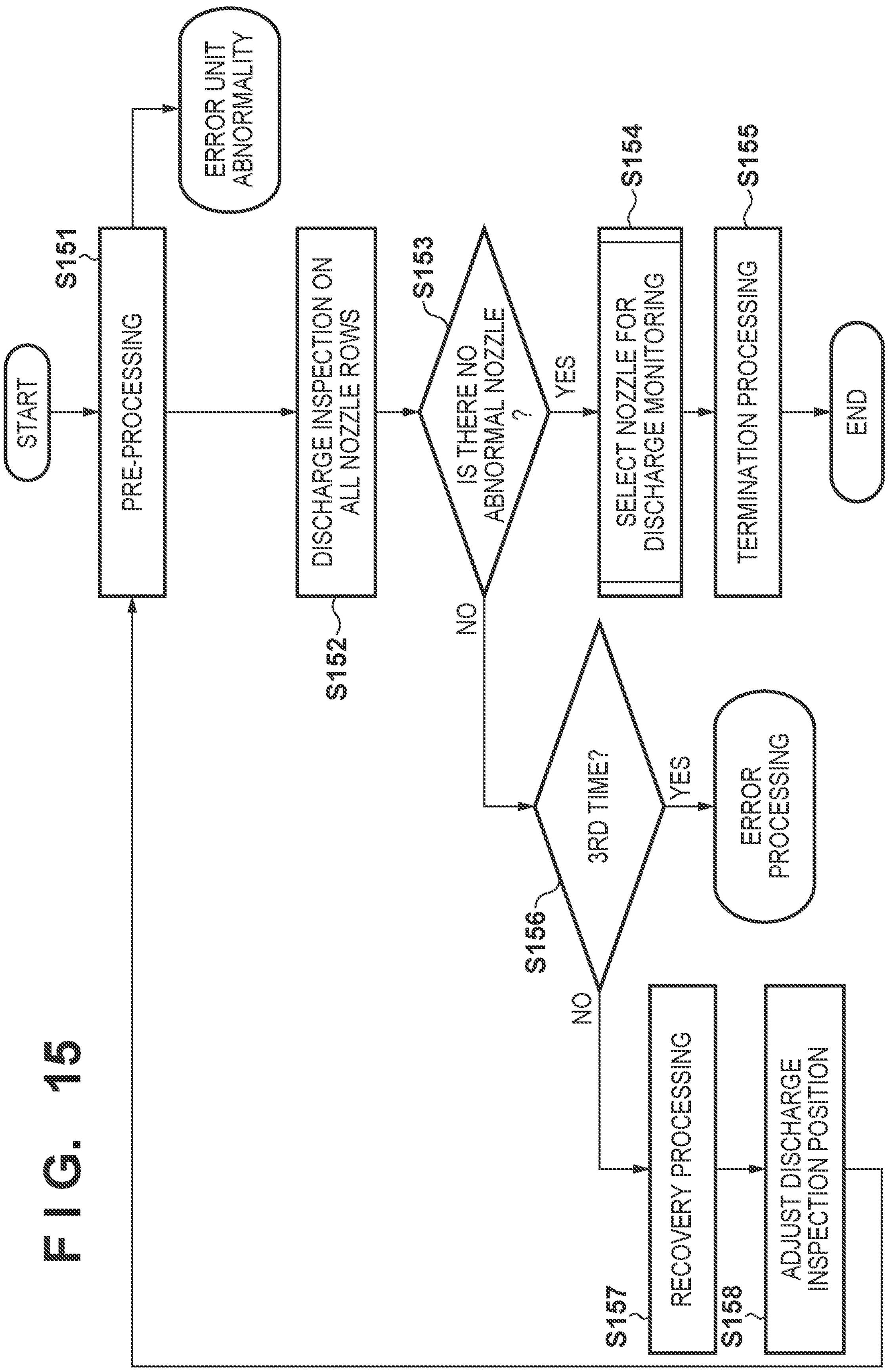
FIG. 15 is a flowchart illustrating a selection operation of a nozzle for discharge monitoring according to a fifth embodiment.

FIG. 15 is a flow chart illustrating an operation of discharge inspection according to the present embodiment. In the present embodiment, the execution timing for the operation of selecting nozzles to be used for discharge monitoring described in the first to fourth embodiments is set to be immediately after completion of discharge inspection of all the nozzle rows.

First, at step S151, the CPU 301 performs pre-processing of discharge inspection and, when an abnormality is detected in the printhead 201, the flow is terminated as an error.

At step S152, the CPU 301 performs discharge inspection of all the nozzles.

At step S153, the CPU 301 determines whether or not there exists an abnormal nozzle in the printhead, and when it is determined that there is no abnormal nozzle, the processing proceeds to step S154. When it is determined that there is an abnormal nozzle, the processing proceeds to step S156.

At step S154, the CPU 301 executes the processing for selection of a nozzle for discharge monitoring illustrated in any of the first to the fourth embodiments. Subsequently, termination processing is performed at step S155, and the operation of the current flow is terminated.

At step S156, the CPU 301 determines whether or not detection of an abnormal nozzle is the third detection, and when detection is the third detection, the flow is terminated as an error. When the detection is not the third detection, the CPU 301 performs recovery processing at step S157.

At step S158, the CPU 301 adjusts the discharge inspection position, and subsequently returns to step S151.

According to the operation of the current flowchart, a nozzle for discharge monitoring is selected each time discharge inspection is executed, whereby the nozzle to be used for discharge monitoring is regularly updated depending on the change of the number of non-discharging nozzles in the printhead.

A case, in which a certain length of time has elapsed after the last discharge inspection, may occur depending on the execution timing of the selection flow of the nozzle for the discharge monitoring described in the first to the fourth embodiments. In such a case, it may not possible to determine a non-discharging nozzle that has arisen during the elapsed time. Since the selection flow of the nozzles to be used is executed immediately after the discharge inspection in the present embodiment, it becomes possible to perform discharge monitoring with a higher reliability.

Here, although the aforementioned embodiment has been described taking as an example of a non-discharging nozzle that is a nozzle to be excluded from the nozzles for discharge monitoring, it does not necessarily have to be a non-discharging nozzle (nozzle having a discharge abnormality). For example, it may also be possible to stop using and replace, in addition to non-discharging nozzles, a nozzle having discharge speed equal to or lower than a certain level (nozzle having a discharge abnormality) with a normal nozzle. In addition, although an example of selecting the nozzle/ink color of highest use frequency as a nozzle for discharge monitoring has been described, the use frequency is not necessarily highest. For example, a nozzle for discharge monitoring may be selected from nozzles/ink colors having use frequency equal to or higher than a threshold value, by setting an appropriate threshold value in accordance with the specifications of the printhead and the printing apparatus.

As has been described above, the aforementioned embodiment allows for excluding non-discharging nozzles or nozzles having discharge speed equal to or lower than a constant value from a nozzle group used for discharge monitoring, so it thereby becomes possible to perform discharge monitoring with a high accuracy. As a result, detection of a flying state of an ink droplet discharged from the printhead can be stabilized, and the possibility of occurrence of an image defect can be more accurately determined before performing printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-203528, filed Dec. 20, 2022, which is hereby incorporated by reference herein in its entirety.

What is claimed is:

1. A printing apparatus comprising:

a selection unit configured to select a predetermined number of nozzles from nozzles of a printhead including a plurality of nozzles configured to discharge a liquid droplet; and a detection unit configured to detect a discharge state of a liquid droplet by using the predetermined number of nozzles being selected, wherein the selection unit selects the predetermined number of nozzles such that a nozzle having a discharge abnormality is not included in the predetermined number of nozzles, the selection unit selects the predetermined number of nozzles from nozzle groups having a same drive timing among the nozzles of the printhead, and when the predetermined number of nozzles being selected include a nozzle having a discharge abnormality, the selection unit replaces the nozzle having the discharge abnormality with a normal nozzle in the nozzle group from which the predetermined number of nozzles are selected.

2. The printing apparatus according to claim 1, wherein the selection unit selects the predetermined number of nozzles from a nozzle group, among the nozzle groups, that has a lowest number of nozzles having a discharge abnormality.

3. The printing apparatus according to claim 1, wherein the selection unit replaces the nozzle having the discharge abnormality with a normal nozzle having a use frequency equivalent to that of the nozzle having the discharge abnormality.

4. The printing apparatus according to claim 1, wherein the selection unit selects, as a spare group, a nozzle group of drive order being anterior or posterior with respect to the nozzle group.

5. The printing apparatus according to claim 4, wherein, when there is no normal nozzle in the nozzle group from which the predetermined number of nozzles are selected, the selection unit replaces the nozzle having the discharge abnormality with a normal nozzle in the nozzles in the spare group.

6. The printing apparatus according to claim 5, wherein the selection unit replaces the nozzle having the discharge abnormality with a normal nozzle among the nozzles in the spare group, the normal nozzle having a use frequency equivalent to that of the nozzle having the discharge abnormality.

7. The printing apparatus according to claim 4, wherein, when a number of nozzles having a discharge abnormality is greater than a predetermined value with respect to a candidate nozzle group in the spare group, the selection unit selects, as the spare group, a nozzle group in which the number of nozzles having a discharge abnormality is equal to or less than the predetermined value, and the drive order is changed.

8. The printing apparatus according to claim 1, wherein the detection unit includes a light-emitting unit configured to emit a light flux in a direction parallel to a discharge surface of the printhead, and a light-receiving unit configured to receive the light flux.

9. The printing apparatus according to claim 8, wherein the detection unit detects a discharge state of a liquid droplet, based on a change of an output signal of the light-receiving unit when the liquid droplet discharged from the nozzle crosses the light flux.

10. The printing apparatus according to claim 9, wherein the detection unit detects a discharge amount of the liquid droplet, based on a degree of a change of an output signal of the light-receiving unit.

11. The printing apparatus according to claim 9, wherein the detection unit detects a discharge speed of the liquid droplet based on a timing of a change of an output signal of the light-receiving unit.

12. A method of controlling a printing apparatus, the method comprising:

selecting a predetermined number of nozzles from nozzles of a printhead including a plurality of nozzles configured to discharge a liquid droplet; and detecting a discharge state of a liquid droplet by using the predetermined number of nozzles being selected, wherein the selecting selects the predetermined number of nozzles such that a nozzle having a discharge abnormality is not included in the predetermined number of nozzles, in the selecting, the predetermined number of nozzles are selected from nozzle groups having a same drive timing among the nozzles of the printhead, and when the predetermined number of nozzles being selected include a nozzle having a discharge abnormality, the nozzle having the discharge abnormality is replaced with a normal nozzle in the nozzle group from which the predetermined number of nozzles are selected.

13. A non-transitory computer-readable storage medium storing a program for causing a computer to execute a method of controlling a printing apparatus, the method comprising:

selecting a predetermined number of nozzles from nozzles of a printhead including a plurality of nozzles configured to discharge a liquid droplet; and detecting a discharge state of a liquid droplet by using the predetermined number of nozzles being selected, wherein the selecting selects the predetermined number of nozzles such that a nozzle having a discharge abnormality is not included in the predetermined number of nozzles, in the selecting, the predetermined number of nozzles are selected from nozzle groups having a same drive timing among the nozzles of the printhead, and when the predetermined number of nozzles being selected include a nozzle having a discharge abnormality, the nozzle having the discharge abnormality is replaced with a normal nozzle in the nozzle group from which the predetermined number of nozzles are selected.

* * * * *